United States Patent
Dhiman et al.

(10) Patent No.: US 10,223,654 B2
(45) Date of Patent: Mar. 5, 2019

(54) AUTOMATED, ACCELERATED PROTOTYPE GENERATION SYSTEM

(71) Applicant: Accenture Global Services Limited, Dublin (IE)

(72) Inventors: Manisha Johar Dhiman, Bangalore (IN); Rajendra T. Prasad, Bangalore (IN); Vijayaraghavan Koushik, Chennai (IN); Sanjoy Paul, Bangalore (IN); Nataraj Kuntagod, Bangalore (IN); Sandeep J. Rathod, Mumbai (IN); Suparna Moitra, Bangalore (IN); Senthil Kumaresan, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 579 days.

(21) Appl. No.: 14/665,275

(22) Filed: Mar. 23, 2015

(65) Prior Publication Data

US 2016/0283893 A1    Sep. 29, 2016

(51) Int. Cl.
*G06F 8/20* (2018.01)
*G06Q 10/06* (2012.01)

(52) U.S. Cl.
CPC ....... *G06Q 10/063118* (2013.01); *G06F 8/20* (2013.01); *G06Q 10/06* (2013.01); *G06Q 10/0631* (2013.01); *G06Q 10/063112* (2013.01)

(58) Field of Classification Search
CPC ...... G06F 8/20; G06Q 10/06; G06Q 10/0631; G06Q 10/06318
See application file for complete search history.

(56) References Cited

U.S. PATENT DOCUMENTS 7,139,999 B2 * 11/2006 Bowman-Amuah ........................ G06Q 10/06
717/101
7,146,347 B1 * 12/2006 Vazquez ................... G06F 8/34
706/12

(Continued)

OTHER PUBLICATIONS

Justinmind, "Define your web, mobile and business applications through functional prototypes Visualize the future of your applications with our Application Simulator," http://www.nohau.se/file/justinmind-brochure.pdf, Aug. 14, 2011, 9 pages.

(Continued)

*Primary Examiner* — Chat C Do
*Assistant Examiner* — Douglas M Slachta
(74) *Attorney, Agent, or Firm* — Harrity & Harrity, LLP

(57) ABSTRACT

The system may receive a group of project requirements from a client for development of a software application. The system may identify the client based on the received group of project requirements. The system may to determine, based on the group of project requirements of the client, a past project requirement submitted by the client or another client or created previously as a generic project requirement and corresponding to a first project requirement of the group of project requirements. The system may determine information created or used for the past project requirement. The system may create information for a second project requirement of the group of project requirements. The system may generate a prototype of the software application based on the information created or used for the past project requirement and the information created for the second project requirement. The system may output the prototype.

20 Claims, 19 Drawing Sheets

(56) References Cited

U.S. PATENT DOCUMENTS

| | | | | |
|---|---|---|---|---|
| 7,188,335 | B1* | 3/2007 | Darr | G06F 8/10 717/104 |
| 7,849,442 | B2* | 12/2010 | Hashizume | G06F 8/10 717/102 |
| 8,121,874 | B1* | 2/2012 | Guheen | G06Q 10/063 705/28 |
| 8,234,143 | B1* | 7/2012 | Brewer | G06Q 10/06 705/7.12 |
| 8,276,123 | B1* | 9/2012 | Deng | G06F 11/3688 714/37 |
| 8,291,387 | B2* | 10/2012 | Pal | G06F 11/3688 703/21 |
| 8,386,994 | B2 | 2/2013 | Subash et al. | |
| 9,274,669 | B1* | 3/2016 | Funderburk | G06F 3/0481 |
| 9,665,351 | B2* | 5/2017 | Amulu | G06F 8/34 |
| 2003/0221184 | A1* | 11/2003 | Gunjal | G06F 8/24 717/118 |
| 2003/0233631 | A1* | 12/2003 | Curry | G06F 8/20 717/100 |
| 2004/0031014 | A1* | 2/2004 | Baecker | G06F 8/20 717/104 |
| 2006/0167577 | A1* | 7/2006 | Clark | G06F 8/71 700/97 |
| 2006/0230381 | A1* | 10/2006 | Moulckers | G06Q 30/02 717/120 |
| 2006/0271925 | A1* | 11/2006 | Schuelein | G06F 8/65 717/168 |
| 2006/0277056 | A1* | 12/2006 | Broberg | G06Q 10/10 705/321 |
| 2008/0134133 | A1* | 6/2008 | DelloStritto | G16H 40/20 717/101 |
| 2008/0244524 | A1* | 10/2008 | Kelso | G06F 11/3664 717/124 |
| 2008/0263505 | A1* | 10/2008 | StClair | G06F 8/10 717/101 |
| 2008/0270159 | A1* | 10/2008 | Constable | G06Q 30/02 705/26.1 |
| 2008/0270980 | A1* | 10/2008 | Ahadian | G06F 8/34 717/109 |
| 2008/0288965 | A1* | 11/2008 | Grechanik | G06F 8/36 719/328 |
| 2010/0211428 | A1* | 8/2010 | Duffy | G06Q 10/06 705/7.14 |
| 2012/0159441 | A1* | 6/2012 | Ghaisas | G06F 8/10 717/123 |
| 2012/0232944 | A1* | 9/2012 | Zhu | G06Q 10/063112 705/7.14 |
| 2012/0304157 | A1* | 11/2012 | Kawashima | G06F 11/3692 717/131 |
| 2013/0007280 | A1* | 1/2013 | Aslam | G06F 9/5055 709/226 |
| 2013/0318492 | A1* | 11/2013 | Satyanarayanan | G06F 8/70 717/104 |
| 2014/0142998 | A1* | 5/2014 | Kroeger | G06Q 10/06311 705/7.13 |
| 2015/0106145 | A1* | 4/2015 | Hamilton | G06Q 10/063114 705/7.15 |
| 2016/0239282 | A1* | 8/2016 | Evans | G06F 8/61 |

OTHER PUBLICATIONS

Agile Modeling, "User Interface (UI) Prototypes: An Agile Introduction," http://agilemodeling.com/artifacts/uiPrototype.htm, Aug. 13, 2003, 5 pages.

Steigerwald et al., "CASE tool for reusable software component storage and retrieval in rapid prototyping," http://www.sciencedirect.com/science/article/pii/095058499190043B, Nov. 1991, 9 pages.

Extended European Search Report corresponding to EP Application No. 16 15 8386.9, dated May 17, 2016, 8 pages.

* cited by examiner

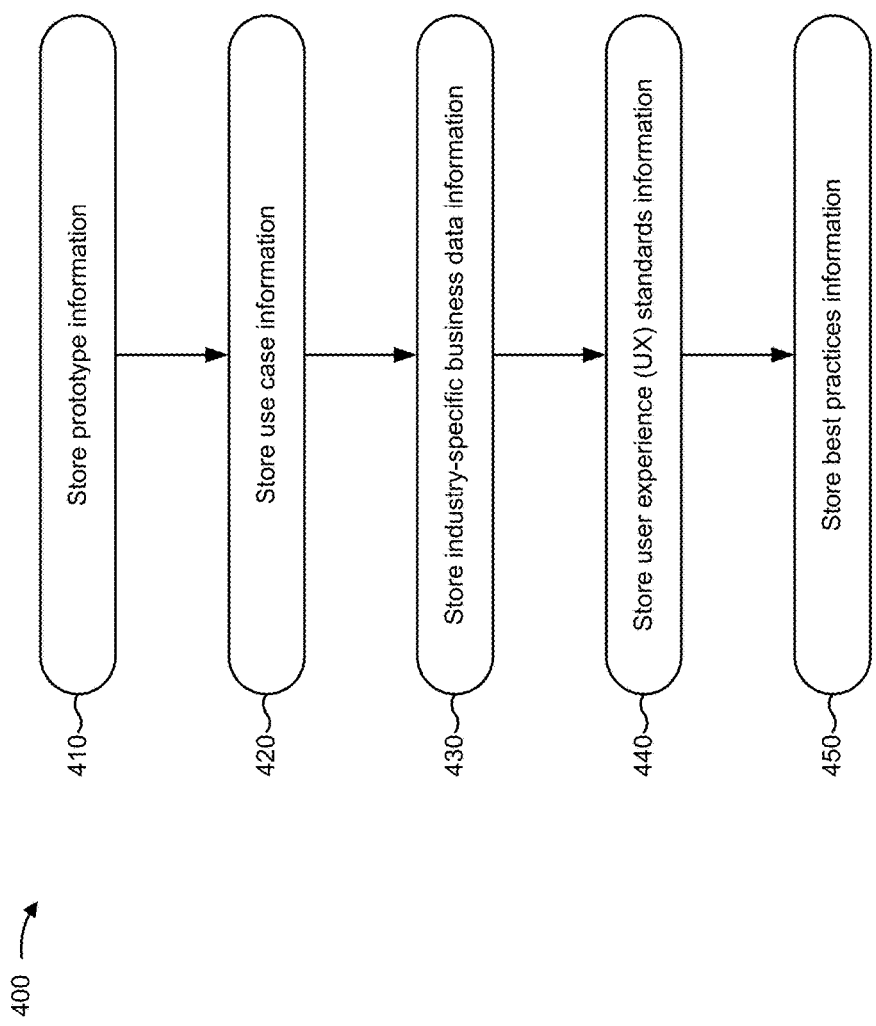

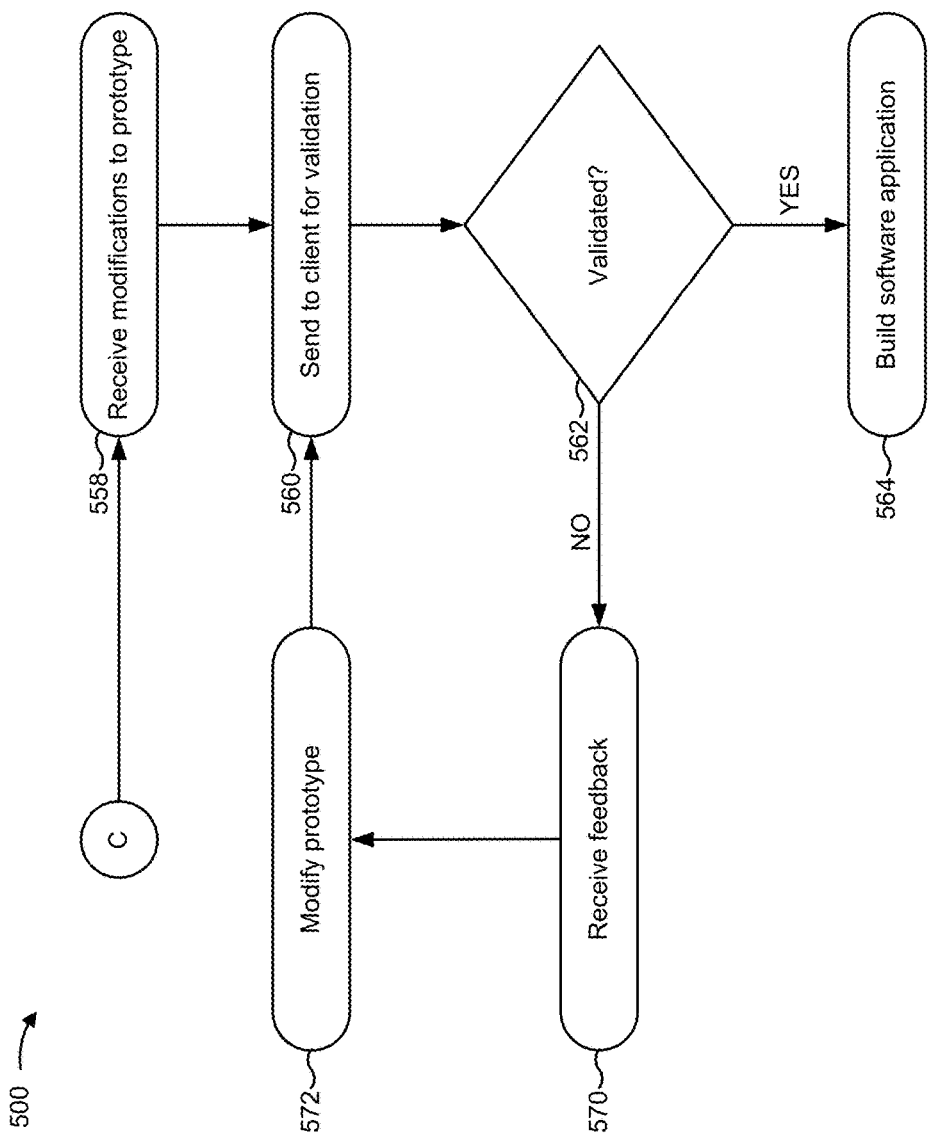

| Development Team Employees | Experience List | | | | | | Score | Available BW |
|---|---|---|---|---|---|---|---|---|
| | Prior Experience with XYZ Corp | Prototype Development Expert | Use Case Expert | Payroll Expert | UX Standard Expert | Best Practices Expert | | |
| Alice Jones | S1 | S2 | S3 | S4 | S5 | S6 | T1 | Y |
| Kiran Patel | S7 | S8 | S9 | S10 | S11 | S12 | T2 | Y |
| Carol Walker | S13 | S14 | S15 | S16 | S17 | S18 | T3 | Y |
| David Cobb | S19 | S20 | S21 | S22 | S23 | S24 | T4 | Y |
| Elizabeth Chen | S25 | S26 | S27 | S28 | S29 | S30 | T5 | Y |
| Frank Martinez | S31 | S32 | S33 | S34 | S35 | S36 | T6 | N |

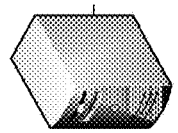
Accelerator Factory Server

Members of the Development Team for Payroll Tool Project for XYZ Corp
- Alice Jones
- Kiran Patel
- David Cobb
} Optimal Cross-functional Team

AUTOMATED, ACCELERATED PROTOTYPE GENERATION SYSTEM

BACKGROUND

Software prototypes simulate some or all aspects of a final software application and are used across various industries. Based on the software prototype, a software development team can test the software application during a project development cycle.

SUMMARY

In some possible implementations, a system may receive a group of project requirements from a client for development of a software application. The system may identify the client based on the received group of project requirements. The system may determine, based on the group of project requirements of the client, a past project requirement submitted by the client or another client or created previously as a generic project requirement and corresponding to a first project requirement of the group of project requirements. The system may determine information created or used for the past project requirement. The system may create information for a second project requirement of the group of project requirements. The system may generate a prototype of the software application based on the information created or used for the past project requirement and the information created for the second project requirement. The system may output the prototype.

In some possible implementations, a computer-readable medium may store instructions that, when executed by one or more processors, cause the one or more processors to receive a group of project requirements for development of a software application. The instructions may cause the processor to determine, based on the group of project requirements, a submitted past project requirement corresponding to a first project requirement of the group of project requirements. The instructions may cause the processor to determine information created or used for the past project requirement. The instructions may cause the processor to create information for a second project requirement of the group of project requirements. The instructions may cause the processor to generate a prototype of the software application based on the information created or used for the past project requirement and the information created for the second project requirement. The instructions may cause the processor to output the prototype.

In some implementations, a method may include receiving, by one or more processors, a group of project requirements from a client for development of a software application. The method may include determining, by one or more processors and based on the group of project requirements, a submitted past project requirement corresponding to a first project requirement of the group of project requirements. The method may include determining, by the one or more processors, information created or used for the past project requirement. The method may include creating or receiving, by the one or more processors, information for a second project requirement of the group of project requirements. The method may include generating, by the one or more processors, a prototype of the software application based on the information created or used for the past project requirement and the information created or received for the second project requirement. The method may include outputting or storing, by the one or more processors, the prototype.

BRIEF DESCRIPTION OF THE DRAWINGS

FIG. 4 is a flow chart of an example process for setting up an automated, accelerated prototype generation system;

FIG. 5A-5D are flow charts of an example process for using an automated, accelerated prototype generation system; and FIGS. 6A-6L are diagrams of an example implementation relating to the example process shown in FIGS. 5A-5D.

DETAILED DESCRIPTION

Figure 1:
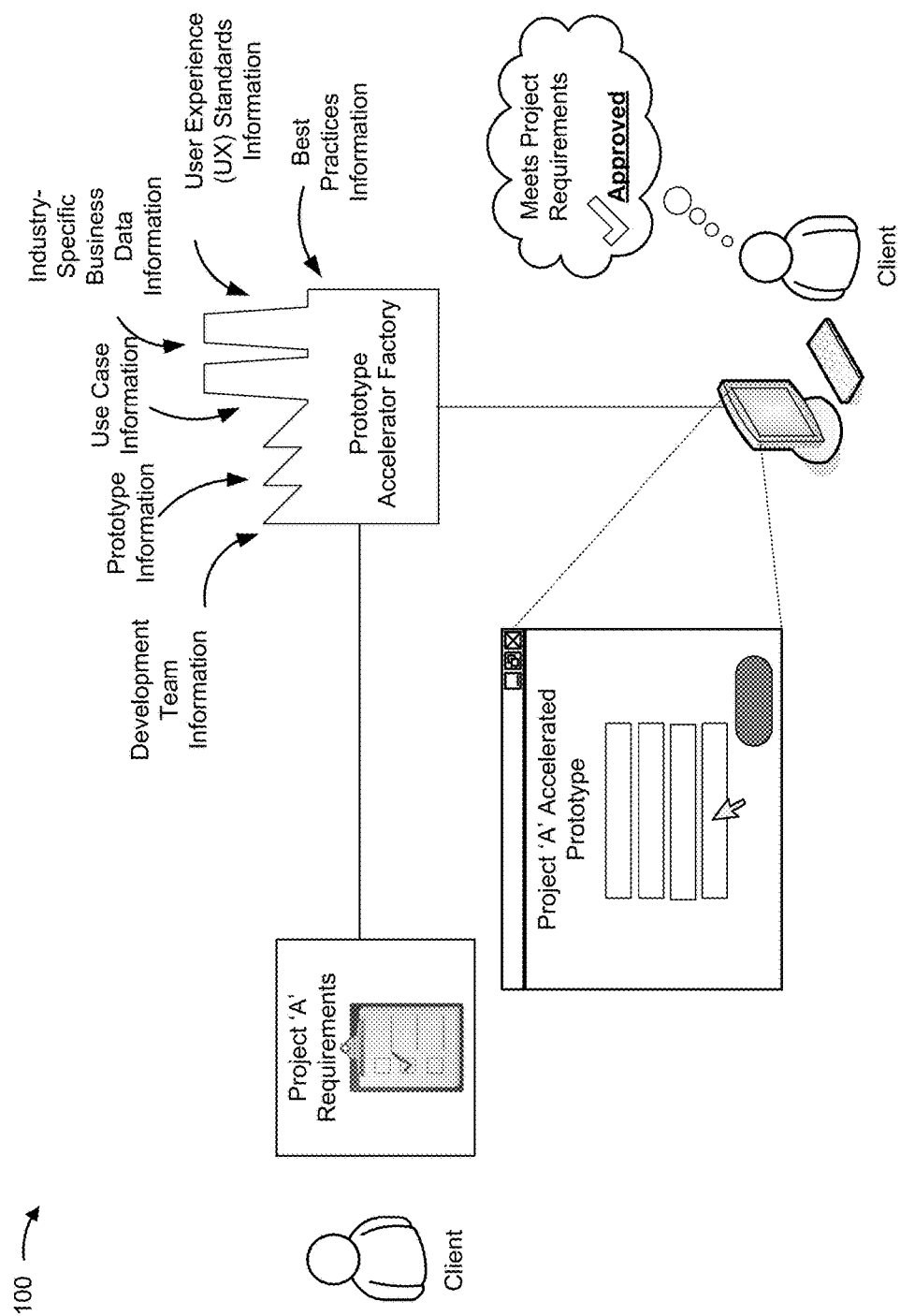
FIG. 1 is a diagram of an overview of an example implementation described herein.

The following detailed description of example implementations refers to the accompanying drawings. The same reference numbers in different drawings may identify the same or similar elements.

Generally, a client, desiring a software application, will provide project requirements to a software development team, detailing the visual design, the features, and the functionality desired in the software application. Without feedback, early in the development process, the software development team may create a software application that does not align with the client's project requirements. Other times, a client may not realize that the project requirements, provided to the software development team, as written, are not desirable and the resulting product may fall short of expectations. Such miscommunication and misalignment on the project requirements may prove costly. Initial project estimates (e.g., an estimate for a budget, a deadline for achieving milestones, an overall project deadline, an allocation of resources, etc.) may no longer be accurate as the client and the software development team attempt to reconcile the differences.

Creating a software prototype (i.e., a preliminary model or an incomplete version of the software application being developed) may alleviate some of the problems caused through the miscommunication and misalignment on the project requirements. The client, through the prototype, may receive an idea of what the final software application will be like. The client may provide feedback to the software development team on any desired changes. This may be an iterative process until the prototype and the project requirements and/or evolving project requirements align. The software development team may then proceed with a full software application build-out, incorporating a working database and/or other components necessary to realize the final product in a cost effective and timely manner. Unless the prototype is created early in the software development process, however, some of the benefits, provided by the software prototyping, are diluted. For example, if the delivery time for the prototype is long, then project costs and overall delivery time may still increase.

Implementations described herein provide an automated, accelerated prototype generation system that rapidly and automatically creates a custom prototype, matching the project requirements set forth by the client. The automated, accelerated prototype generation system may be considered evolutionary, allowing for the rapid and automatic creation of a prototype for feedback and validation, by using and/or reusing existing resources available to the automated, accelerated prototype generation system. For example, existing resources may include a previously generated prototype or a previously generated portion of a prototype (a "prototype element") that is relevant to the current project requirements. Existing resources may also include a software development team, made up of members with relevant functional knowledge and prior, relevant project experience. Existing resources may also include industry-specific business data and client-specific work product and know-how. Existing resources may be created, updated, and/or stored for each version of the existing resources, created during the development process.

FIG. 1 is a diagram of an overview of an example implementation 100 described herein. As shown in FIG. 1, example implementation 100 may include a client device, such as a personal computer, and a prototype accelerator factory. The client device may send information, such as a set of project requirements, to the prototype accelerator factory. The prototype accelerator factory may include one or more server devices and/or one or more user devices. A project may be a software application (e.g., a mobile application, a website, a web product, an enterprise application, etc.), which a client desires to have created. A project requirement is a description of a set of services that the software application is to provide and the constraints under which the software application is to operate. The project requirement may range from high-level abstract statements of services and/or system constraints to detailed functional specifications.

As shown in FIG. 1, a prototype accelerator factory may receive the set of project requirements, for a prototype to be automatically generated based on the set of project requirements. The prototype accelerator factory may perform an analysis of the set of project requirements to automatically create a project plan for the client. As shown in FIG. 1, the prototype accelerator factory may include stored information, such as prototype information, use case information, industry-specific business data information, user experience (UX) standards information, best practices information, and/or other information.

As shown in FIG. 1, the prototype accelerator factory may use the stored information to rapidly analyze the set of project requirements and create the project plan. For example, the prototype accelerator factory may consider various factors (e.g., whether the client had previously requested a prototype, the similarities between the project requirements and any past project requirements by the client and/or other clients, the ability to reuse prototypes or prototype elements (e.g., either custom or generic), the expertise and available bandwidth of the development team, the industry-specific business data (e.g., size of the project, historical budget estimates, historical milestone estimates, etc.), and/or other information to perform the rapid analysis.

The project plan is used to validate the prototype accelerator factory's synthesis of the project requirements, including the scope of the project and/or the project objectives. As shown in FIG. 1, the prototype accelerator factory may send the project plan to the client device for validation. For example, the project plan may include an outline or a storyboard, providing a high-level overview of the software application to be developed, including the functionality to be provided by the software application and the visual design for the software application. The project plan may include a preliminary timeline for achieving milestones, an estimate time for delivery, and/or a preliminary budget. The project plan may also include a preliminary roster of individuals (or types of individuals) that will be assigned to the development team, best suited to rapidly build, test, and/or deploy the prototype.

If the project plan meets the client's expectations, the client will validate the project plan. If the project plan does not meet the client's expectation, the client will provide feedback to the prototype accelerator factory (e.g., modifications to the visual design, modifications to the functionality displayed, modifications to the project requirements, etc.), until the client receives a project plan that meets the client's expectations. At this time, the project plan may be validated.

As shown in FIG. 1, the prototype accelerator factory may receive the validated project plan. Based on any revised project requirements, the prototype accelerator factory may further utilize the stored information to generate the prototype. For example, the prototype accelerator factory may use and/or reuse relevant, previously generated and stored, prototypes or prototype elements to rapidly build-out a wireframe for the software application. A wireframe is a visual guide that represents the skeletal framework of a software application and the flow and the interconnectivity between the various parts of the software application. Wireframes are created for the purpose of arranging elements to best accomplish the project requirements. By using and/or reusing previously, generated prototypes and/or prototype elements, the prototype accelerator factory may require less time and resources, generating new prototype elements or entire, new prototypes.

As shown in FIG. 1, the prototype accelerator factory may use and/or reuse stored UX standards, to streamline the process for implementing enhancements to a user's interaction with the software application. For example, if the UX standards are already associated with certain previously, generated prototypes or prototype elements being implemented, the analysis and implementation of the UX standards are straightforward and, therefore, fast.

Further, as shown in FIG. 1, the prototype accelerator factory may employ previously, generated and stored use cases (or scripts) and/or industry-specific business data to test the interconnectivity, flow, and/or functionality of the wireframe. For example, if the use cases and/or the industry-specific business data were previously employed to test previously, generated prototypes or prototype elements, then the results will be predictable and the prototype design will require minimal or no modification.

As shown in FIG. 1, the prototype accelerator factory may identify members for a development team who have previously provided work product and/or input for the client and/or worked on other projects with similar project requirements, from a list of development team employees included in the development team information and stored in acceleratory factory memory 240 and/or another memory. Staffing the team with relevant experience and existing know-how may decrease the time of delivery.

Further, the prototype accelerator factory may employ best practices to increase the speed of delivery and quality of the final prototype. Best practices are methods or techniques, previously employed by the prototype accelerator factory, and have consistently shown superior results, during all phases of the development. By using and/or reusing existing and evolutionary information and/or tools, validating project requirements early, and capitalizing on existing knowledge and/or expertise, the prototype accelerator factory can rapidly and automatically generate and deliver a final prototype solution to meet the client's expectations.

Figure 2:
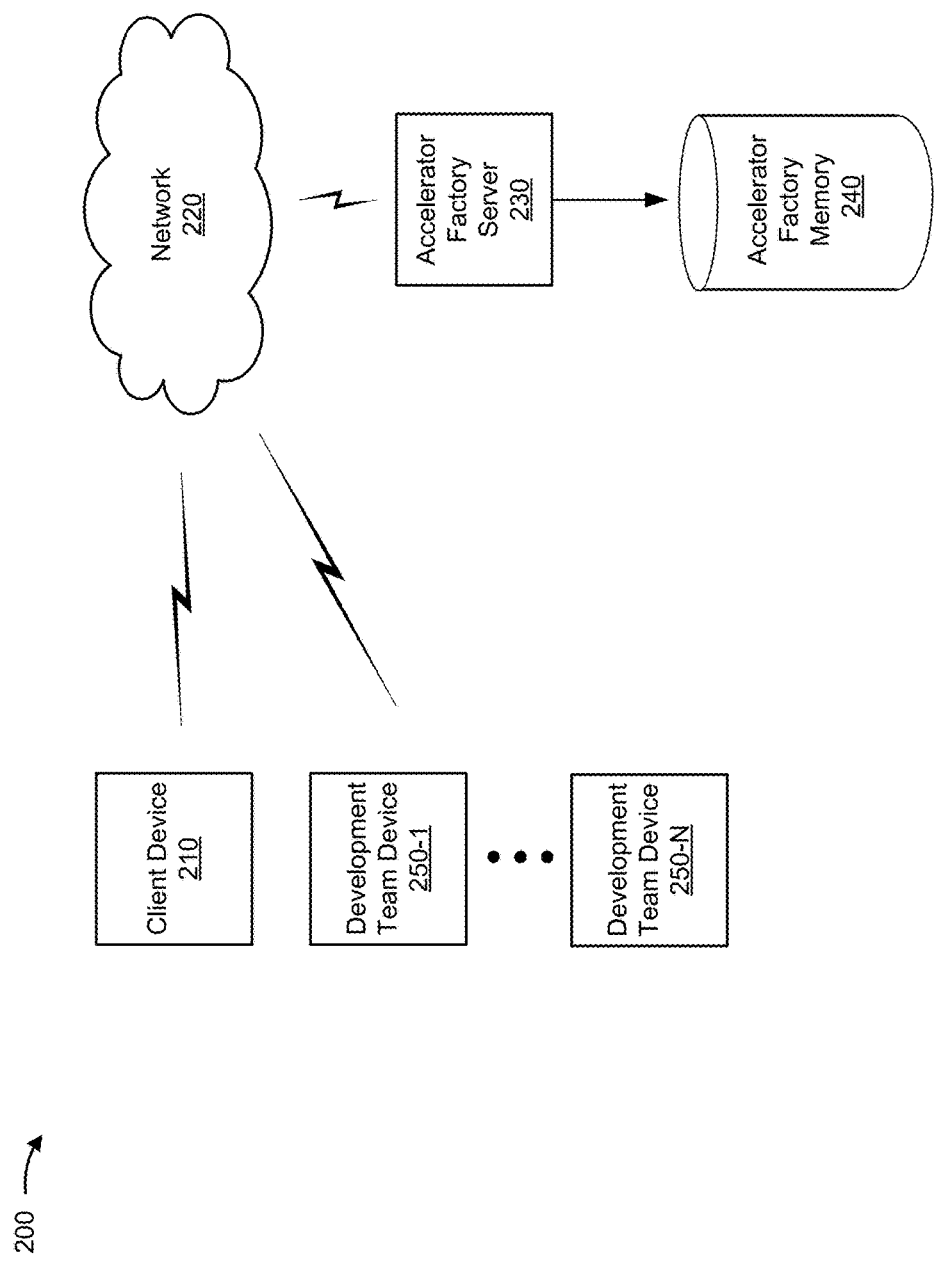
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network 220, an accelerator factory server 230, an accelerator factory memory 240, and one or more development team devices 250-1 through 250-N (N≥1) (hereinafter referred to collectively as "development team devices 250," and individually as "development team device 250"). Devices of environment 200 may interconnect via wired connections, wireless connections, or a combination of wired and wireless connections.

Client device 210 may include a device capable of providing, presenting, and/or displaying information. For example, client device 210 may include a mobile phone (e.g., a smart phone, a radiotelephone, etc.), a computing device (e.g., a desktop computer, a laptop computer, a tablet computer, a handheld computer, etc.), or a similar device. In some implementations, client device 210 may include a communication interface that allows client device 210 to receive information from and/or transmit information to accelerator factory server 230 and/or development team device 250.

Network 220 may include one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Accelerator factory server 230 may include one or more server devices capable of generating, processing, and/or providing information. In some implementations, accelerator factory server 230 may generate, process, store, and/or provide project plan information to client device 210, development team device 250, and/or another device. Additionally, or alternatively, accelerator factory server 230 may generate, process, store, and/or provide prototype information, such as prototype information, use case information, industry-specific business data information, UX standards information, and/or best practices information. Additionally, or alternatively, accelerator factory server 230 may generate, process, store, and/or provide performance metrics information. In some implementations, accelerator factory server 230 may include a communication interface that allows accelerator factory server 230 to receive information from and/or transmit information to client device 210, accelerator factory memory 240, development team devices 250, and/or another device.

Accelerator factory memory 240 may include one or more memory devices capable of processing, storing, and/or providing information. In some implementations, accelerator factory memory 240 may process, store, and/or provide information, such as the prototype information, the use case information, the industry-specific business data information, the UX standards information, and/or the best practices information (described in more detail with regard to FIG. 4). Accelerator factory memory 240 may store the prototype information as a database of information, as a table, as a linked list, or in another form or arrangement of data.

Development team device 250 may include a device capable of providing, presenting, and/or displaying information. For example, development team device 250 may include a mobile phone (e.g., a smart phone, a radiotelephone, etc.), a computing device (e.g., a desktop computer, a laptop computer, a tablet computer, a handheld computer, etc.), or a similar device. In some implementations, development team device 250 may include a communication interface that allows development team device 250 to receive information from and/or transmit information to client device 210 and/or accelerator factory server 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
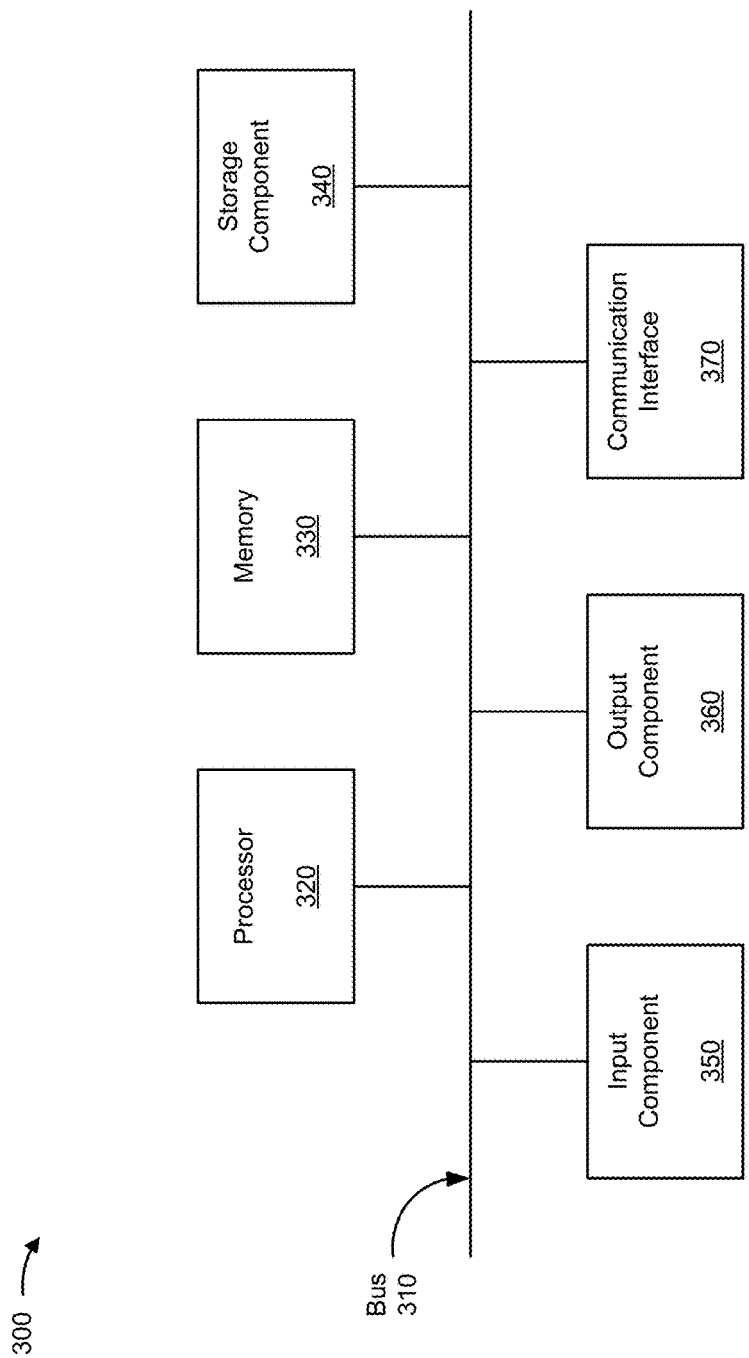
FIG. 3 is a diagram of example components of one or more devices of FIG. 2.

FIG. 3 is a diagram of example components of a device 300. Device 300 may correspond to client device 210, accelerator factory server 230, accelerator factory memory 240, and/or development team device 250 of FIG. 2. In some implementations, client device 210, accelerator factory server 230, accelerator factory memory 240, and/or development team device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for setting up an automated, accelerated prototype generation system. In some implementations, one or more process blocks of FIG. 4 may be performed by accelerator factory server 230. In some implementations, one or more process blocks of FIG. 4 may be performed by another device or a set of devices separate from or including accelerator factory server 230, such as one or more development team devices 250.

As shown in FIG. 4, process 400 may include storing prototype information (block 410). For example, accelerator factory server 230 may receive prototype information from development team device 250 or another device or set of devices. The prototype information may be a set of code, created for one or more previously generated prototypes or prototype elements for a client or a set of clients Additionally, or alternatively, the prototype information may include a set of code for generic prototypes or generic prototype elements, previously generated by the development team and/or a third party development team. Generic prototypes or prototype elements may be used for creating features and/or performing functionality that are common or standard in a software application.

Additionally, or alternatively, the prototype information may be versions of code that were generated but not incorporated in a final prototype or prototype element. The version of the code may be tagged with identifying information associating the versions of code with generic project requirements for future use.

Additionally, or alternatively, the prototype information may include configuration data, documentation, templates, and/or other non-volatile resources to be used in support of generating a prototype or prototype element. Additionally, or alternatively, the prototype information may include versions of configuration data, documentation, templates, and/or other non-volatile resources that were generated but not utilized for the final prototype or prototype element. The prototype information may include versions of configuration data, documentation, templates, and/or other non-volatile resources that may be tagged with identifying information associating the versions of configuration data, documentation, templates, and/or other non-volatile resources with new project requirements for future use.

In some implementations, accelerator factory server 230 may store the prototype information in accelerator factory memory 240. In some implementations, accelerator factory server 230 may store the prototype information in another memory device or a collection of memory devices accessible by accelerator factory server 230.

As further shown in FIG. 4, process 400 may include storing use case information (block 420). For example, accelerator factory server 230 may receive use case information from development team device 250 or another device or set of devices. The use case information may include a set of use cases. A use case may be a set of instructions that may be performed on the software application during the development phase to test that the software application functions operate as expected. Additionally, or alternatively, a use case may include a mechanism for determining whether a software application has passed or failed such a test. Additionally, or alternatively, a use case may be versions of use case information that were generated but not utilized for the final prototype or prototype element. The versions of the use case information may be tagged with identifying information associating the versions of use case information with generic project requirements for future use.

In some implementations, the use case may be performed manually, where a user will determine whether a software application or one of the software application's features and/or functionalities is working as originally intended. Additionally, or alternatively, the use case may be performed automatically, using an automated testing method (e.g., a short program written, using a special automated functional test tool, such as HP QuickTest Professional, or a programming language, such as C++, a data-driven testing method, a keyword-driven or table driven testing method, etc.).

Additionally, or alternatively, the use case information may include configuration data, documentation, templates, and/or other non-volatile resources to be used in support of generating a set of use cases. Additionally, or alternatively, the use case information may include versions of configuration data, documentation, templates, and/or other non-volatile resources that were generated but not utilized for the final prototype or prototype element. The use case information may include versions of configuration data, documentation, templates, and/or other non-volatile resources that may be tagged with identifying information associating the versions of configuration data, documentation, templates, and/or other non-volatile resources with generic project requirements for future use. In some implementations, accelerator factory server 230 may store the use case information in accelerator factory memory 240. In some implementations, accelerator factory server 230 may store the use case information in another memory device or a collection of memory devices accessible by accelerator factory server 230.

As further shown in FIG. 4, process 400 may include storing industry-specific business data information (block 430). For example, accelerator factory server 230 may receive industry-specific business data information from a data feed, client device 210, development team device 250, and/or another device, such as a device associated with a client, a competitor of the client or a third party device that collects industry-specific business data. Industry-specific business data information may include industry-specific business data. The industry-specific business data may include sample data used to test a set of use cases.

Additionally, or alternatively, the industry-specific business data may include contextual information for the sample data, such as how the sample data may be related and/or interrelated. Additionally, or alternatively, the industry-specific business data may be versions of industry-specific business data that were gathered and/or aggregated but not utilized for the final prototype or prototype element. The versions of industry-specific business data may be tagged with identifying information associating the versions of industry-specific business data with generic project requirements for future use.

Additionally, or alternatively, the industry-specific business data information may include configuration data, documentation, templates, and/or other non-volatile resources to be used in support of utilizing the industry-specific business data. Additionally, or alternatively, the industry-specific business data information may include versions of configuration data, documentation, templates, and/or other non-volatile resources that were generated but not utilized for the final prototype or prototype element. The industry-specific business data information may include versions of configuration data, documentation, templates, and/or other non-volatile resources that may be tagged with identifying information associating the versions of configuration data, documentation, templates, and/or other non-volatile resources with generic project requirements for future use. In some implementations, accelerator factory server 230 may store the industry-specific business data information in accelerator factory memory 240. In some implementations, accelerator factory server 230 may store the industry-specific business data information in another memory device or a collection of memory devices accessible by accelerator factory server 230.

As further shown in FIG. 4, process 400 may include storing UX standards information (block 440). For example, accelerator factory server 230 may receive UX standards information from client device 210, development team device 250 and/or a third party device. UX standards information may include a set of UX standards that may be applied, during the development of the software application, to facilitate and/or encourage efficient and effective human-computer interactions (HCI), and may enhance a user's overall experience with the software application. Additionally, or alternatively, UX standards may include a set of instructions to reduce the user's overall workload. For example, the UX standards may be a set of instructions, directing the software application to provide any information displayed to the user in a direct and usable format, and to structure the organization of the software application's content is a manner that is highly intuitive to a user.

Additionally, or alternatively, the UX standards may include a set of instructions, directing the software application to execute a sequence of tasks in a manner consistent with how the user typically will perform the tasks. UX standards may include a variety of standards, directed towards enhancing the user's overall experience with the software application, including design standards, interface standards, graphics standards, industrial design standards, physical interaction standards, etc. Additionally, or alternatively, the UX standards may include versions of UX standards that were generated but not utilized for the final prototype or prototype element. The versions of UX standards may be tagged with identifying information associating the versions of UX standards with generic project requirements for future use.

Additionally, or alternatively, the UX standards information may include configuration data, documentation, templates, and/or other non-volatile resources to be used in support of utilizing the UX standards for the software application. Additionally, or alternatively, the UX standards information may include versions of configuration data, documentation, templates, and/or other non-volatile resources that were generated but not utilized for the final prototype or prototype element. The UX standards information may include versions of configuration data, documentation, templates, and/or other non-volatile resources that may be tagged with identifying information associating the versions of configuration data, documentation, templates, and/or other non-volatile resources with generic project requirements for future use. In some implementations, accelerator factory server 230 may store the UX standards information in accelerator factory memory 240. In some implementations, accelerator factory server 230 may store the UX standards information in another memory device or a collection of memory devices accessible by accelerator factory server 230.

As further shown in FIG. 4, process 400 may include storing best practices information (block 450). For example, accelerator factory server 230 may receive best practices information from client device 210, development team device 250, and/or another device. Best practices information may include a set of best practices. A best practice is a technique or methodology that, through experience and research, has proven to reliably lead to a desired result. For example, best practices may include a series of steps to ensure delivery of a high quality software application, desired to meet the client's project requirements (e.g., by using an iterative development process, by managing project requirements, by implementing quality control testing, by monitoring change to code, etc.). Additionally, or alternatively, best practices information may include versions of best practices that were received client device 210, development team device 250, and/or another device but not utilized for the final prototype or prototype element. The versions of best practices may be tagged with identifying information associating the versions of best practices with generic project requirements for future use.

Additionally, or alternatively, the best practices information may include configuration data, documentation, templates, and/or other non-volatile resources to be used in support of utilizing the best practices standards in the development of the software application. Additionally, or alternatively, the best practices information may include versions of configuration data, documentation, templates, and/or other non-volatile resources that were generated but not utilized for the final prototype or prototype element. The best practices information may include versions of configuration data, documentation, templates, and/or other non-volatile resources that may be tagged with identifying information associating the versions of configuration data, documentation, templates, and/or other non-volatile resources with generic project requirements for future use. In some implementations, accelerator factory server 230 may store the best practices information in accelerator factory memory 240. In some implementations, accelerator factory server 230 may store the best practices information in another memory device or a collection of memory devices accessible by accelerator factory server 230.

By storing not only the final versions of existing resources (e.g., prototype information, use case information, industry-specific data information, UX standards information, best practices information, etc.) that satisfy a client's project requirements and are incorporated in a final prototype but all prior versions and/or iterations generated and/or aggregated during the software development process, the automated, accelerated prototype generation system may be considered evolutionary, rapidly satisfying future project requirements.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D illustrate a flow chart of an example process 500 for using an automated, accelerated prototype generation system. In some implementations, one or more process blocks of FIGS. 5A-5D may be performed by accelerator factory server 230. Additionally, or alternatively, one or more process blocks of FIGS. 5A-5D may be performed by another device or a group of devices separate from or including accelerator factory server 230, such as client device 210 and/or one or more development team devices 250.

Figure 5A:
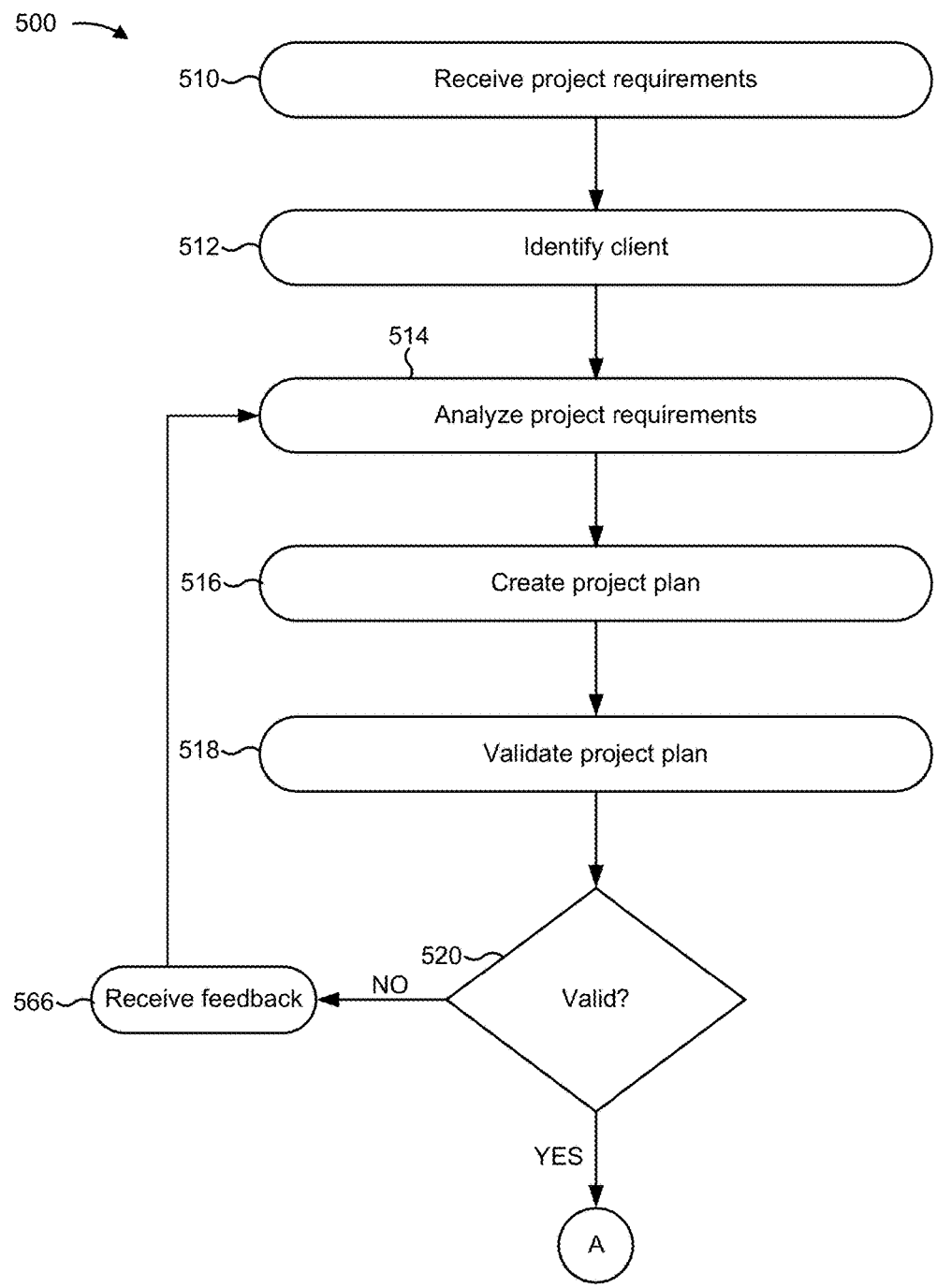

As shown in FIG. 5A, process 500 may include receiving project requirements (block 510). For example, accelerator factory server 230 may receive the project requirements for a software application as an input by a user of client device 210. The user of client device 210, providing the project requirements to accelerator factory server 230, may be referred herein to as a client. The project requirements may be general, such as outlining certain big-picture objectives, desired by the client for the software application or the project requirements may be specific, such as providing desired interface information, functional capabilities, performance levels, and/or data structures for the software application. In some implementations, the client may input the project requirements, using a web-based form, available on a user device, such as client device 210 and/or another device, into accelerator factory server 230 for processing. In some implementations, the client may input the project requirements through an e-mail and/or an attachment to an e-mail into accelerator factory server 230 for processing.

As further shown in FIG. 5A, process 500 may include identifying the client (block 512). For example, accelerator factory server 230 may identify the client, by receiving client information (e.g. a client name, a client identifier, an account number, etc.) as part of the project requirements received in block 510. The client may be a new client, an existing client or a prior client. A new client is a client who provides project requirements for a software application to accelerator factory server 230 for the first time. An existing client is a client who has provided project requirements to accelerator factory server 230 and may presently have a pending project for a software application. A prior client is a client who has provided project requirements to accelerator factory server 230 and does not presently have a pending project for a software application. Project requirements provided by existing and/or prior clients may be stored in accelerator factory memory 240.

In some implementations, accelerator factory server 230 may identify the client based on querying the data entered through the web-based form. In some implementations, accelerator factory server 230 may identify the client based on information provided in the e-mail or the attachment to the e-mail and/or by querying and/or parsing the e-mail or the attachment to the e-mail.

As further shown in FIG. 5A, process 500 may include analyzing the project requirements (block 514). For example, accelerator factory server 230 may analyze the project requirements by determining a scope and/or a type of project requested (e.g., an on-line store application, a payroll software application, an inventory tracking application, a website, etc.). Additionally, or alternatively, accelerator factory server 230 may translate the project requirements, provided by the client, into specific tools and/or functionality, to be used to create the software application (e.g., for payroll software, for example, accelerator factory server 230 may recommend as tools and/or functionality, a payroll calculator, a method for paying employees, accounting tools, and/or salary comparison charts). Accelerator factory server 230 may recommend incorporating tools and/or functionality mentioned in the client's project requirements. Additionally, or alternatively, accelerator factory server 230 may analyze and create wireframes, incorporating features, the tools, and/or the functionality meeting the project requirements for the software application and demonstrating a data flow and interconnectivity between the wireframes. Additionally, or alternatively, accelerator factory server 230 may analyze the project requirements to estimate a size of a database when populated with data used to execute the tools and/or the functionality meeting the project requirements.

As further shown in FIG. 5A, process 500 may include creating a project plan (block 516). For example, accelerator factory server 230 may create a project plan by summarizing the analysis of the project requirements. The project plan may include a restatement of the project requirements, the tools and/or the functionality to be used to meet the project requirements, the wireframes, and/or other project information (e.g., projected milestones, a projected completion date for delivering a functioning prototype of the software application, a projected completion date for delivering the software application, an estimated budget, etc.). The project information may be calculated based on data generated during the analysis of the project requirements (e.g., a quantity of the tools and/or the functionality to be used, complexity of the tools and/or the functionality, the size of the database, etc.).

In some implementations, the project plan may be created based on input received from one or more development team devices 250 and/or another device. In some implementations, the creation of the project plan may be automated through accelerator factory server 230 based on the analysis of the project requirements. For example, the project plan may include a template presenting certain information (e.g., the restatement of the project requirements, the tools and/or the functionality to be used for meeting the project requirements, the wireframes, the project information, etc.). The template for the project plan may be automatically populated with the analyzed data (e.g., the restatement of the project requirements, the tools and/or the functionality to be used to meet the project requirements, the wireframes, the other project information, etc.) that is gathered and/or generated during the analysis of the project requirement.

As further shown in FIG. 5A, process 500 may include validating the project plan (block 518). For example, accelerator factory server 230 may determine whether the project plan is valid by sending the project plan to client device 210 for the client to review. The client may verify whether the project plan meets the provided project requirements. In some implementations, the project plan may be an attachment to an e-mail. The client may then validate the project plan in a response e-mail. In some implementations, the project plan may be accessed on-line by the client, using special log-in information provided to the client. In this case, the project plan may be validated on-line, for example, by the client clicking a button. By analyzing the project requirements and/or requiring the client to validate the project plan early in the development phase of the software application, any misunderstandings or misalignments on the project requirements may be caught early, thereby decreasing development time for the software application and/or minimizing costs.

Figure 5B:
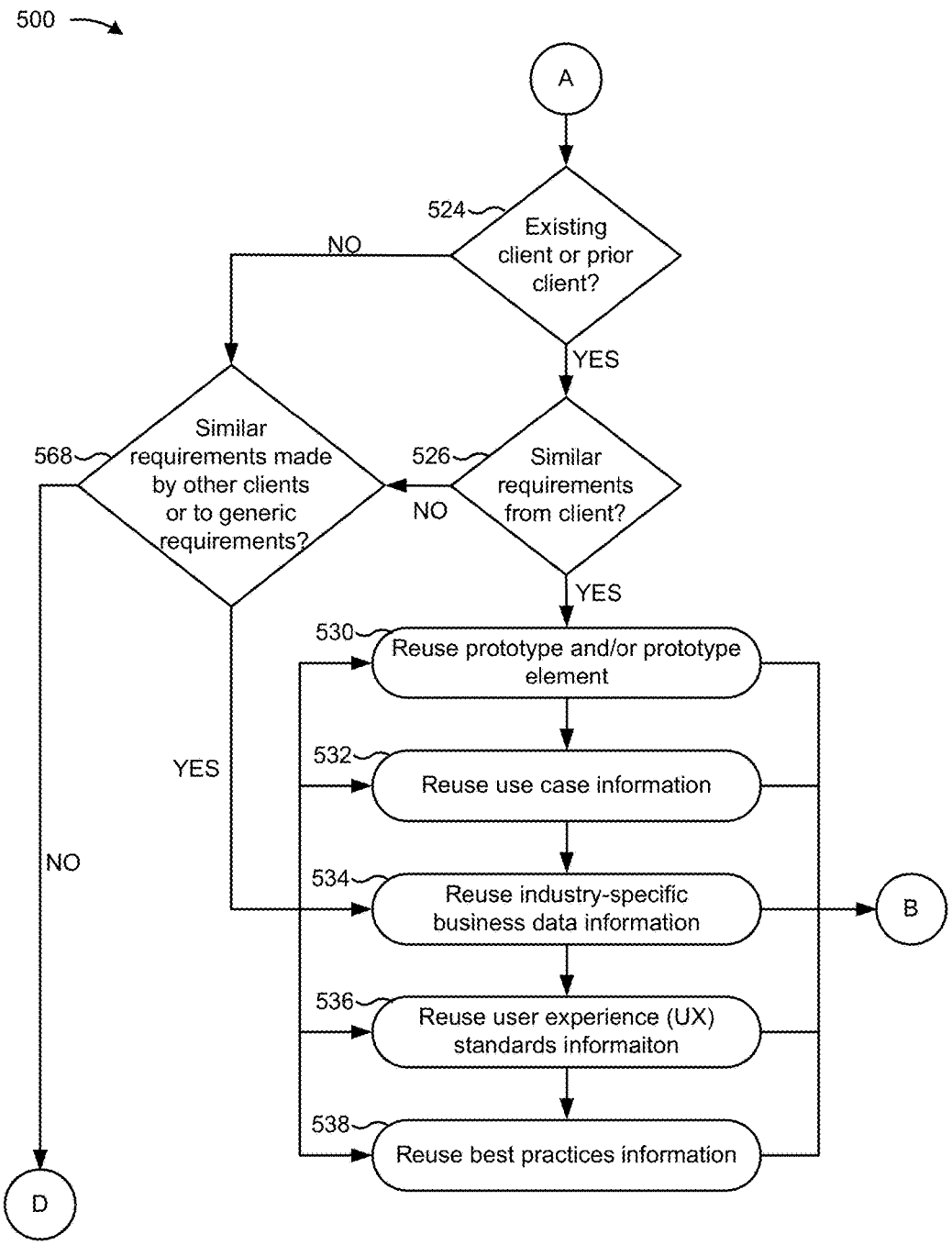

As further shown in FIG. 5A, when the project plan is valid (block 520—Yes), process 500 may include determining whether the client is an existing client or a prior client (FIG. 5B, block 524). For example, accelerator factory server 230 may compare the identity of the client based on the client information (e.g., the client name, the client identifier, the account number, etc., FIG. 5A, block 512) to client information of existing and/or prior clients stored in accelerator factory memory 240 and/or another device. Accelerator factory server 230 may determine whether the client is a match to an existing client or a prior client. Accelerator factory server 230 may use different querying tools, such as SQL querying, to search for the match.

As further shown in FIG. 5B, when the client is an existing client or a prior client (block 524—Yes), process 500 may include determining whether the project requirements are similar to past project requirements provided by the client (block 526). For example, accelerator factory server 230 may query accelerator factory memory 240 to determine whether the project requirements are similar to past project requirements provided by the client. Accelerator factory server 230 may make a query for the past project requirements provided by the client, separately and/or collectively.

In some implementation, accelerator factory server 230 may provide analytic information, rating the similarity of the project requirement with the past project requirements. The past project requirements may include past project requirements provided by the client and/or another client and/or may include generic project requirements previously stored by accelerator factory memory 240 and/or another device. For example, accelerator factory server 230 may assign a similarity score, ranking a similarity between each of the project requirements and the past project requirements (e.g., a highest degree of similarity receiving a highest score, a second highest degree of similarity receiving a second highest score, a third highest degree of similarity receiving a third highest score, etc.). In some implementations, accelerator factory server 230 may select information associated with the past project requirements, receiving the highest scores, for reuse in the development of the software application. Information associated with the past project requirements may include prototypes or prototype elements, use case information, industry-specific business data information, UX standards information, and/or best practices information used to satisfy the past project requirements. In some implementations, if the past project requirements for the same client and another client and/or the stored generic requirements receive the same similarity score, accelerator factory server 230 may use the information associated with the past project requirements for the same client. Reusing information from the same client may increase speed of validation, as the client has already likely validated the reused information in the past. In some implementations, accelerator factory server 230 may set a threshold for the similarity score, where a past project requirement may require receiving a similarity score above a certain threshold to be selected for reuse in the project. Requiring a minimum threshold may ensure that the project requirements and the past project requirements are similar enough to increase the likelihood of a quick validation of a prototype and/or the software application.

As further shown in FIG. 5B, when the project requirements are similar to past project requirements provided by the client, process 500 may include reusing a prototype and/or a prototype element (block 530). For example, accelerator factory server 230 may reuse a prototype and/or a prototype element, previously generated to meet the similar past project requirements to build a part of a prototype or an entire prototype of the software application. Depending on the similarity between the project requirements and the past project requirements, accelerator factory server 230 may reuse a single previously generated prototype element, many previously generated prototype elements, or the entire previously generated prototype. By reusing the previously generated prototype and/or prototype elements, prototype accelerator factory 230 may require less time and resources, generating new prototype elements or an entirely new prototype to satisfy the project requirements.

As further shown in FIG. 5B, process 500 may include reusing use case information (block 532). For example, accelerator factory server 230 may reuse use case information, previously developed to satisfy the similar past project requirements. In some implementations, if accelerator factory server 230 reuses a previously generated prototype and/or prototype element (block 530), then the use case information developed to test the previously generated prototype and/or prototype element may be reused. By reusing the use case information to test the prototype and/or the prototype elements of the software application, the results of the testing may be predictable and the prototype and/or the prototype elements developed for the software application may require minimal or no modification.

As further shown in FIG. 5B, process 500 may include reusing industry-specific business data information (block 534). For example, accelerator factory server 230 may reuse industry-specific business data information received and/or developed to satisfy the similar past project requirements. In some implementations, if accelerator factory server 230 reuses a previously generated prototype, a prototype element, and/or use case information, then any industry-specific business data information received and/or developed to generate and/or test the previously generated prototype, the prototype element, and/or the use case information may be reused. By reusing industry-specific business data information, for example, to test the previously generated prototypes, the prototype elements, and/or the use cases, the results may be predictable and the prototype and/or the prototype elements developed for the software application may require minimal or no modification.

As further shown in FIG. 5B, process 500 may include reusing UX standards information (block 536). For example, accelerator factory server 230 may reuse UX standards information used to satisfy the similar past project requirements. In some implementations, if accelerator factory server 230 reuses a previously generated prototype and/or prototype element (block 530), then any associated UX standards, implemented to enhance a user's experience of the previously generated prototype and/or the prototype element may also be reused. By reusing the UX standards information, associated with the previously generated prototype and/or prototype element being implemented, the analysis and implementation of the UX standards will be straightforward and, therefore, fast.

As further shown in FIG. 5B, process 500 may include reusing best practices information (block 538). For example, accelerator factory server 230 may reuse best practices information, developed to satisfy the similar past project requirements. In some implementations, if accelerator factory server 230 reuses a previously generated prototype and/or prototype element, then any associated best practices, developed during the design, development, testing, and/or use of the previously generated prototype and/or prototype element may be reused. By reusing the best practices, associated with the previously generated prototypes and/or prototype elements, the rate of delivering a high quality software application, meeting the client's project requirements, may increase.

Figure 5C:
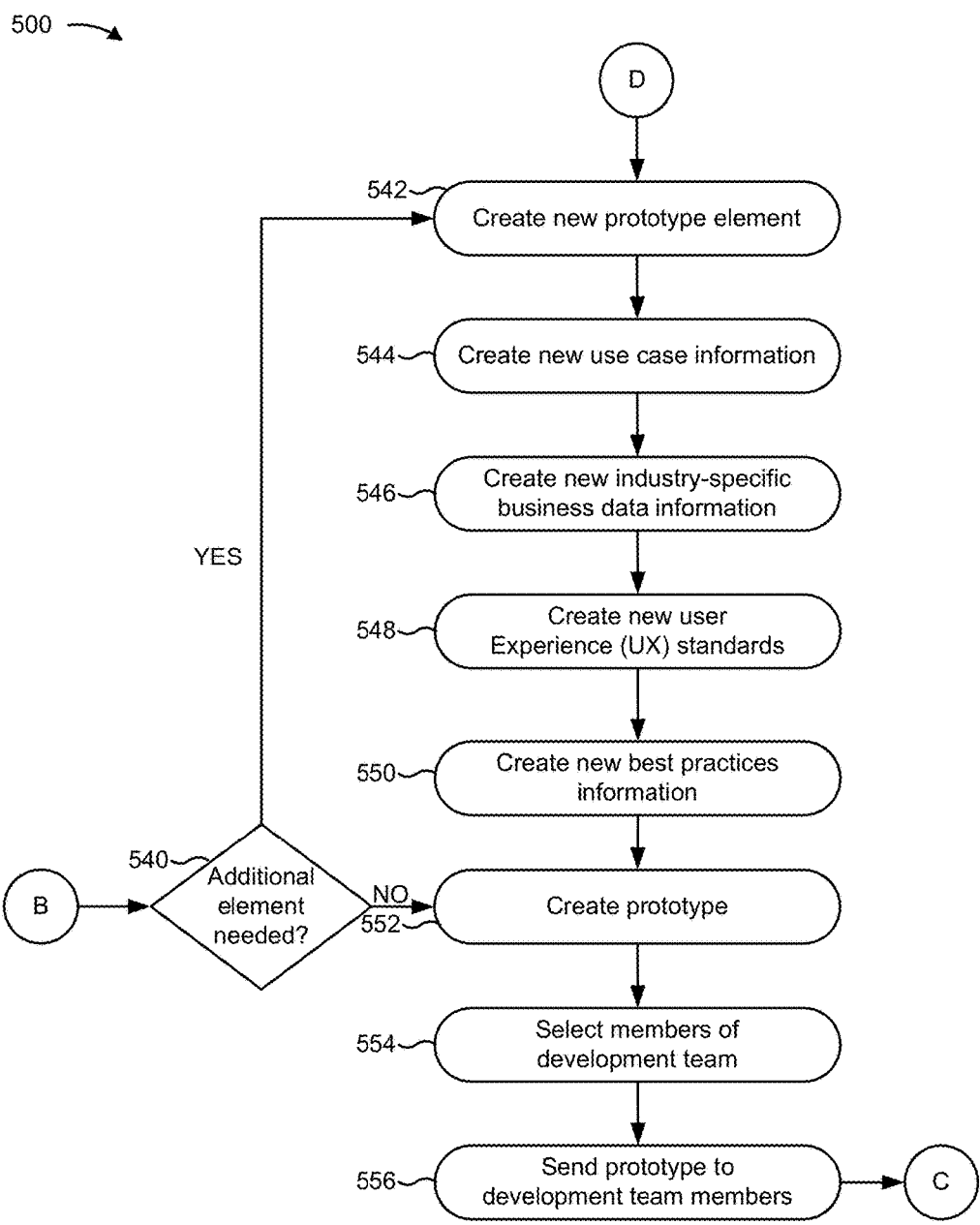

As further shown in FIG. 5C, process 500 may include determining whether an additional prototype element is needed (block 540). For example, accelerator factory server 230 may verify whether all the project requirements are met by reusing previously generated prototypes and/or prototype elements. If there are project requirements still not satisfied by reusing previously generated prototypes and/or prototype elements, then accelerator factory server 230 may determine that additional prototype elements are to be created. As a result, only a small sub-set of the prototype elements may need to be generated to satisfy the project requirements, thereby, increasing the speed for delivering the prototype and subsequently, the software application to the client, increasing the efficiency of the prototyping process, and/or minimizing the cost to the client.

As further shown in FIG. 5C, when an additional prototype element is needed (block 540—Yes), process 500 may include creating a new prototype element (block 542). For example, in a case where previously generated prototype elements do not satisfy all of the project requirements, accelerator factory server 230 may create one or more new prototype elements to meet the remaining project requirements. For example, accelerator factory server 230 may automate the process of generating new code and/or modifying existing code to create the new prototype elements. Accelerator factory server 230 may use an integrated set of software prototyping tools that generate source code programs directly from the project requirements to create the new prototype elements. In some implementations, accelerator factory server 230 may create the new prototype elements by using the new code and/or the modifications to the existing code received from one or more development team devices 250 and/or another device. For example, accelerator factory server 230 may send information to a develop team member, associated with a development team device 250, to instruct and assist the development team member in creating the new code and/or the modification to the existing code.

As shown in FIG. 5C, process 500 may include creating new use case information (block 544). For example, accelerator factory server 230 may create new use case information to test the new prototype element(s) created. In some implementations, accelerator factory server 230 may automate the process of creating the new use case information. For example, accelerator factory server 230 may use an integrated set of software tools that create the new use case information directly from analyzing the new prototype elements that the new use case information is created to test. In some implementations, accelerator factory server 230 may receive the new use case information from one or more development team devices 250 and/or another device. For example, accelerator factory server 230 may send information to a develop team member, associated with a development team device 250, to instruct and assist the development team member in creating the new use case information.

As further shown in FIG. 5C, process 500 may include creating new industry-specific business data information (block 546). For example, accelerator factory server 230 may create new industry-specific business data information, by receiving and/or processing new industry-specific business data information from a data feed, client device 210, development team device 250, and/or another device, such as a device associated with a client, a competitor of the client or a third party device that collects industry-specific business data.

As further shown in FIG. 5C, process 500 may include creating new UX standards information (block 548). For example, accelerator factory server 230 may create the new UX standards information by receiving input from one or more development team devices 250 and/or another device. The input may include information (e.g., instructions, guidelines, know-how, etc.) related to developing the new UX standards information that may be applied to the new prototype element(s).

As further shown in FIG. 5C, process 500 may include creating new best practices information (block 550). For example, accelerator factory server 230 may create the new best practices information by receiving input from one or more development team devices 250 and/or another device. The input may include information (e.g., instructions, guidelines, know-how, etc.) related to developing the best practices information that may be applied to the new prototype element(s), the new use case information, the new UX standards information, or the like.

As further shown in FIG. 5C, process 500 may include creating a prototype (block 552). For example, accelerator factory server 230 may use the project plan, the tools, and/or functionality to be used for meeting the project requirements, and/or the wireframes to create a template for code to build out the prototype. The template for the prototype may be automatically populated with a prototype and/or a prototype element identified for reuse. Additionally, and/or alternatively, the template for the prototype may be automatically populated with a newly created prototype and/or prototype element. In some implementations, accelerator factory 230 may use programming languages, such as HTML, CSS, or JavaScript, to build and/or compile the prototype.

As further shown in FIG. 5C, process 500 may include selecting members of a development team (block 554). For example, accelerator factory server 230 may select members for the development team, from a list of development team employees, included in the development team information, who have experience that is relevant to the project requirements (e.g., prior experience with the client, prior experience developing prototypes and/or prototype elements, prior experience developing prototypes and/or prototype elements selected for reuse, prior experience with use case(s) selected for reuse, prior experience with relevant industry-specific business data, prior experience with UX standards, prior experience with best practices, available bandwidth to work as a member of the development team, etc.). Various experience considered relevant to the project requirements may be referred to collectively, as an "experience list." The development team information may be stored in accelerator factory memory 240 and/or another memory. Development team employees and the development team employees selected as members of the development team may be employed by one entity and/or multiple entities. The development team employees and/or the members of the development team may be direct hires and/or sub-contractors of one or more entities. In some implementations, block 554 may occur prior to block 542 or even earlier in process 500.

In some implementations, each development team employee may receive an experience score, rating a strength of the development team employee's prior experience (e.g., a strong, an average, or a weak score, a numerical score, a relevant or not relevant rating, etc.). For example, each relevant experience from the experience list may be assigned a level of importance (e.g., prior experience with the client may be assigned as a most important factor, prior experience with the relevant industry-specific business data may be assigned a second most important factor, prior experience developing a prototype and/or prototype elements selected for reuse may be assigned as a third most important factor, etc.) based on the project requirements and/or some other factor.

Additionally, and/or alternatively, each relevant experience may be weighted based on the assigned level of importance, where the most important relevant experience may receive a higher weighting than a less important prior experience (e.g. prior experience with the client may be determined as the most important relevant experience and given a weight of 50%, prior experience with the relevant industry-specific business data may be determined as a relevant experience of lesser importance and assigned a weight of 25%, prior experience developing the prototype and/or prototype elements selected for reuse determined as a relevant experience of even lesser importance and may be assigned a weight of 15%, etc.).

Additionally, and/or alternatively, a total weight amount for all the relevant experiences on the experience list may equal 100%. The development team employee may receive a point value based on the level and/or quality of experience for a relevant experience from the experience list that the development team employee possesses (e.g., 0 points for no experience, 1 point for very little and/or marginally relevant experience, 2 points for some and/or more relevant experience, 3 points for a lot and/or highly relevant experience, etc.). The point value for each relevant experience (e.g., 3 points) from the experience list is multiplied by the weight given to each relevant experience to calculate an experience score (e.g., prior experience with the client may be given an experience score of 1.5 (3 points×0.50), prior experience with the relevant industry-specific business data may be given an experience score of 0.75 (3 points×0.25), prior experience with developing the prototype and/or prototype elements selected for reuse may be given an experience score of 0.45 (3 points×0.15), etc.). In some implementations, multiple relevant experiences may have the same measure of importance and may receive the same weighting.

In some implementations, a total experience score may be a sum of the individual experience scores received for each relevant experience (e.g., a development team employee having prior experience with the client, prior experience with the relevant industry-specific business data, and prior experience with developing the prototype and/or prototype elements selected for reuse may receive a total experience score of 2.70, a development team employee having prior experience with the client and prior experience with the relevant industry-specific business data may receive a total experience score of 2.25, a development team employee having prior experience only with the client may receive a total experience score of 1.50, etc.). The members of the development team may be selected based on selecting the fewest number of team members having the highest experience score and/or total experience score and collectively possessing all the relevant experiences on the experience list. This is one of way of calculating the total experience score, and other ways may be possible.

In some implementations, the members of the development team may be selected by selecting the development team employee receiving the highest experience score for each relevant experience on the experience list. In some implementations, the members of the development team may be selected based on the development team employee receiving an experience score above a certain threshold, indicating a certain level of competency, for each relevant experience on the experience list. In some implementations, the members of the development team may be selected based on the development team employee receiving a total experience score above a certain threshold, indicating a certain level of overall competency. The threshold for the experience score and/or the total experience score may be input by an operator of accelerator factory server 230 and/or determined automatically, based on factoring the number of development team employees available and the quantity of relevant experiences included on the experience list. This is one way of automating the threshold for the experience score and/or the total experience score, and other ways may be possible.

In some implementations, the available bandwidth to work as a member of the development team may be a separate factor from the experience list. The available bandwidth for a selected member of the development team (e.g., selected because of receiving the highest experience score for a particular relevant experience, etc.) may be compared to an available bandwidth requirement that may be included, for example, in the project plan. If the selected member of the development team has available bandwidth equal to or greater than the available bandwidth requirement included in the project plan, then the selected member of the development team is kept. Otherwise, the selected member of the development team is unselected and accelerator factory server 230 may select another member of the development team having available bandwidth that is equal to or greater than the available bandwidth requirement included in the project plan (e.g., by selecting the development team employee receiving the second highest score for the particular relevant experience).

In some implementations, if the selected member of the development team has available bandwidth less than the available bandwidth requirement included in the project plan, then the selected member of the development team is kept (e.g., based on a decision to keep members of the development team with the highest experience score for the particular relevant experience) and accelerator factory server 230 may select another development team member (e.g., receiving the second highest score for the particular relevant experience) for the development team to make up for any shortfall in the available bandwidth of the member of the development team receiving the highest experience score for the particular relevant experience.

Additionally, and/or alternatively, acceleratory factory server 230 may allocate tasks designed to meet the project requirements between the multiple members of the development team having similar relevant experience based on a percentage of each development team member's available bandwidth. In some implementations, acceleratory factory server 230 may allocate the tasks determined to be significant to the development team member having the higher experience score for the similar relevant experience. Additionally, or alternatively, acceleratory factory server 230 may allocate the tasks determined to be less significant to the member of the development team having the lower experience score for the similar relevant experience.

A determination of whether a development team employee has the available bandwidth equal to and/or greater than the available bandwidth requirement included in the project plan may happen before or after assigning an experience score and/or a total experience score. If the determination happens before assigning an experience score and/or a total experience score, then the development team employees having available bandwidth less than the available bandwidth requirement included in the project plan may not be considered for further selection as a member of the development team. Selecting members of the development team to have relevant functional knowledge and prior, relevant project experience increases the speed for delivering the prototype and subsequently, the software application to the client, thereby, increasing the efficiency of the prototyping and software application development process, and/or minimizing the cost to the client.

As further shown in FIG. 5C, process 500 may include sending the prototype to the development team members (block 556). For example, accelerator factory server 230 may send the prototype to one or more development team devices 250 for modification. Members of the development team may check the project requirements, verify if the project requirements are being met by the prototype, and/or modify the prototype, if the project requirements or parts of the project requirements are not being met. Additionally, and/or alternatively, members of the development team may modify the prototype to improve the look and/or the usability of the prototype to better meet the client's expectations. By allowing the members of the development team to verify the prototype and provide modifications, any errors generated (e.g., from an inappropriate selection of reused information, coding problems, design issues) may be minimized and/or corrected.

As shown in FIG. 5D, process 500 may include receiving the modifications to the prototype (block 558). For example, accelerator factory server 230 may receive the modifications to the prototype made by the members of the development team, in block 556, using one or more development team devices 250 and/or another device.

As further shown in FIG. 5D, process 500 may include sending the modified prototype to the client for validation (block 560). For example, accelerator factory server 230 may determine whether the prototype is valid by sending the prototype from accelerator factory server 230 to client device 210 for the client to review.

As further shown in FIG. 5D, process 500 may include determining whether the client validated the prototype (block 562). For example, accelerator factory server 230 may determine whether the prototype is valid by receiving a validation from client device 210. The client, after receiving the prototype via client device 210 and/or another device, may verify whether the prototype meets the project requirements submitted (e.g., the prototype possesses all the features and/or the functionality expected, the use cases run correctly and produce expected results, the prototype's look and feel is as the client desires, etc.). The client may then validate the prototype in a response e-mail. In some implementations, the prototype may be accessed on-line by the client, using special log-in information provided to the client. In this case, the prototype may be validated on-line, for example, by the client clicking a button.

As further shown in FIG. 5D, when the prototype is validated (block 562—Yes), process 500 may include building the software application (block 564). For example, once the prototype is validated, accelerator factory server 230 may build the software application with a working database, fully populated with relevant data, ready for final testing and validation. In some implementations, the members of the development team may build the software application using one or more development devices 250 and/or another device. In some implementations, the build-out of the software application may be automated. For example, accelerator factory server 230 may use an integrated set of software coding tools that use the validated prototype as a template to generate source code programs for the build-out of the software application. Additionally, or alternatively, accelerator factory server 230 may use the integrated set of software coding tools to create one or more databases. Additionally, or alternatively, accelerator factory server 230 may use the integrated set of software coding tools to populate the one or more databases.

When the project plan is not validated (FIG. 5A, block 520—No), process 500 may include receiving feedback (block 566), returning to block 514, and reanalyzing the project requirements to create a new project plan for validation. For example, accelerator factory server 230 may receive feedback from the client (e.g., the project plan does not meet all the requirements specified, additional project requirements are provided, the original project requirements require modification, etc.) that initiates reanalyzing of the project requirements. In some implementations, additional wireframes may be created. Other estimates (e.g., the date of completion, the milestones provided, the estimate budget, etc.) may be recalculated. Accelerator factory server 230 may need to create a new project plan for validation based on the modifications made to the analysis of the project requirements.

When the client is not an existing client or a prior client (FIG. 5B, block 524—No) or when the project requirements are not similar to other project requirements provided by the client (block 526—No), process 500 may include determining whether the project requirements are similar to the past project requirements made by another client and/or to the generic project requirements, stored in accelerator factory memory 240 and/or another device (block 568).

When additional elements are not needed to meet the project requirements (FIG. 5C, block 540—No), process 500 may include continuing to block 552 to create the prototype.

When the project requirements are similar to the past project requirements made by another client and/or to the generic requirements stored in accelerator factory memory 240 and/or another device (FIG. 5B, block 568—Yes), process 500 may include returning to block 530 and reusing the prototype elements created to satisfy the similar past project requirements made by the other client and/or the generic requirements.

When the project requirements are not similar to the past project requirements made by another client and/or to the generic project requirements (block 568—No) and/or new prototype elements are needed to meet the project requirements (FIG. 5C, block 540—Yes), process 500 may include returning to block 542 and creating the new prototype elements.

When the prototype is not validated by the client (FIG. 5D—block 562—No), process 500 may include receiving feedback (block 570). For example, accelerator factory server 230 may receive feedback (e.g., the prototype does not meet the project requirements, the prototype does not function as expected, the client desires additional functionality and/or features, etc.) from the client. The feedback may specify which project requirements are not met, which functions the prototype does not perform, which additional functionality and/or features are desired, or the like.

As further shown in FIG. 5D, process 500 may include modifying the prototype based on the client's feedback (block 572) and may include returning to block 560 to send the modified prototype to the client for validation. For example, accelerator factory server 230 may modify the prototype based on the feedback received from the client. In some implementations, accelerator factory server 230 may receive the modifications to the prototypes from one or more development team devices 250 and/or another device. For example, accelerator factory server 230 may send information to a development team member, associated with a development team device 250, to instruct and assist the development team member in modifying the prototype based on the client's feedback.

Although FIGS. 5A-5D show example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. Additionally, or alternatively, unless stated otherwise, each block should be treated as optional.

FIGS. 6A-6L are diagrams of an example implementation 600 relating to example process 500 shown in FIGS. 5A-5D. In example implementation 600, accelerator factory server (e.g., accelerator factory server 230) may allow a client to submit project requirements and validate a prototype generated based on the project requirements for a final software application build-out, using an automated, accelerated prototype generation system.

Figure 6A:
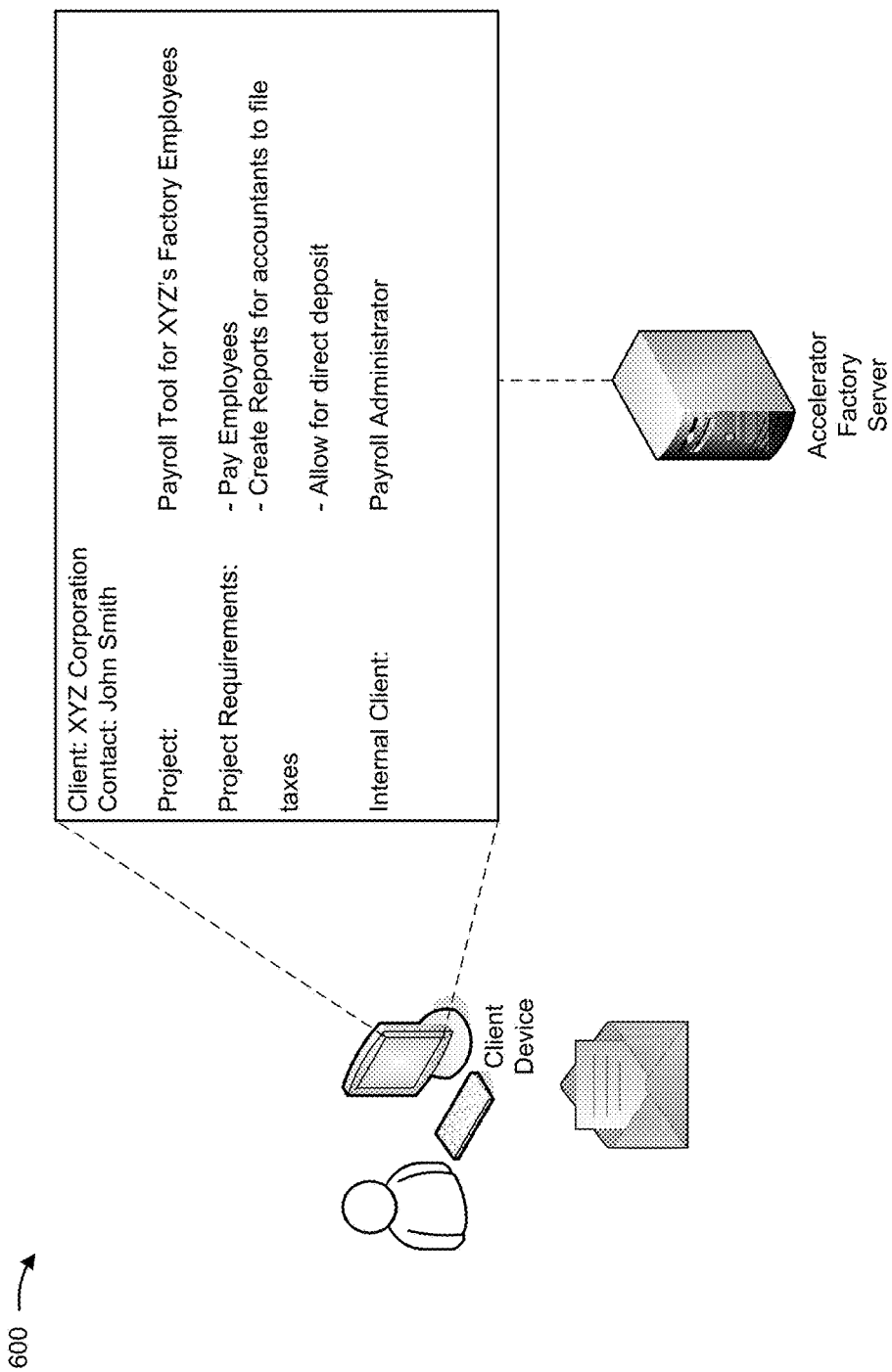

Assume that a client, XYZ Corporation, desires a software payroll application to pay XYZ Corporation's factory employees. Assume that XYZ Corporation has performed an internal analysis to determine a scope for the software payroll application project and desired objectives, allowing XYZ Corporation to create project requirements. As shown in FIG. 6A, XYZ Corporation submits the project requirements, as an attachment to an e-mail, using client device 210.

Figure 6B:
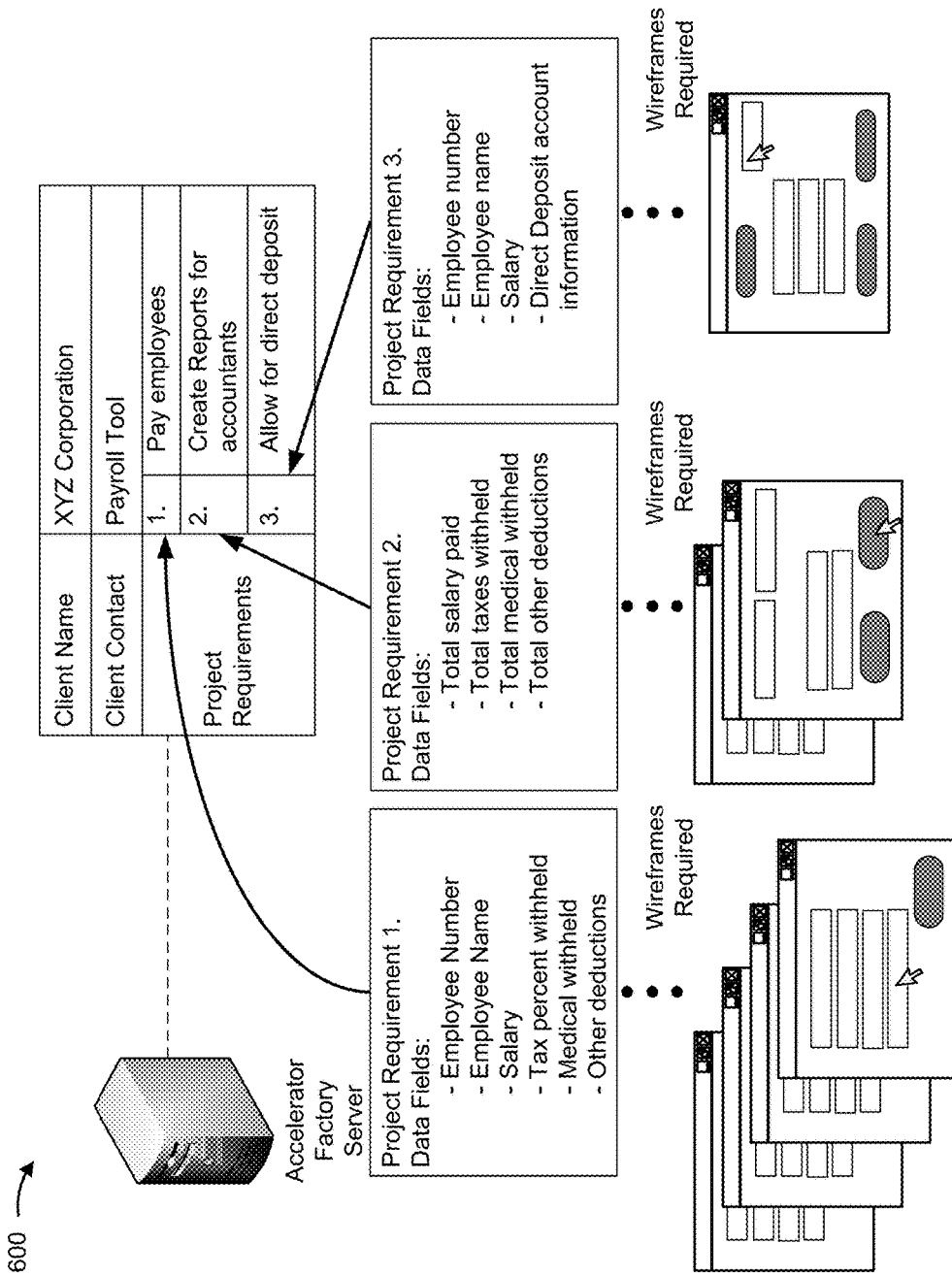

Assume that accelerator factory server 230 parses the text of the e-mail and the attachment to the e-mail. As shown in FIG. 6B, based on client information (e.g., client name) provided in the e-mail and the attachment to the e-mail, accelerator factory server 230 identifies the client as XYZ Corporation. Accelerator factory server 230 analyzes the project requirements set forth in the e-mail attachment and determines that XYZ Corporation's project requirements include: 1) pay employees; 2) create reports for accountants to file taxes; and 3) allow for direct deposit. Accelerator factory server 230 identifies tools and underlying data to be used to meet the project requirements. To meet 'Project Requirement 1—Pay employees,' accelerator factory server 230 determines that a payroll calculator is to be used. Accelerator factory sever 230 determines the underlying data to be created and/or used (e.g., employee number, employee name, employee salary, tax percent withheld, medical withheld, etc.) for the payroll calculator and creates wireframes, demonstrating the features and/or functionality of the payroll calculator. To meet 'Project Requirement 2—Create reports for accountants,' accelerator factory server 230 determines that a payroll report generator is to be used. Accelerator factory sever 230 determines the underlying data to be created and/or used (e.g., total salary paid to all employees, total salary paid to individual employees, total taxes withheld for all employees, total taxes withheld for individual employees, etc.) for the payroll report generator and creates wireframes, demonstrating the features and/or functionalities of the payroll report generator. To meet 'Project Requirement 3—Allow for Direct Deposit,' accelerator factory server 230 determines that a direct deposit tool is to be used. Accelerator factory server 230 determines the underlying data to be created and/or used (e.g., employee name, employee number, salary, direct deposit account information, etc.) for the direct deposit tool and creates wireframes, demonstrating the features and/or functionality of the direct deposit tool.

Figure 6C:
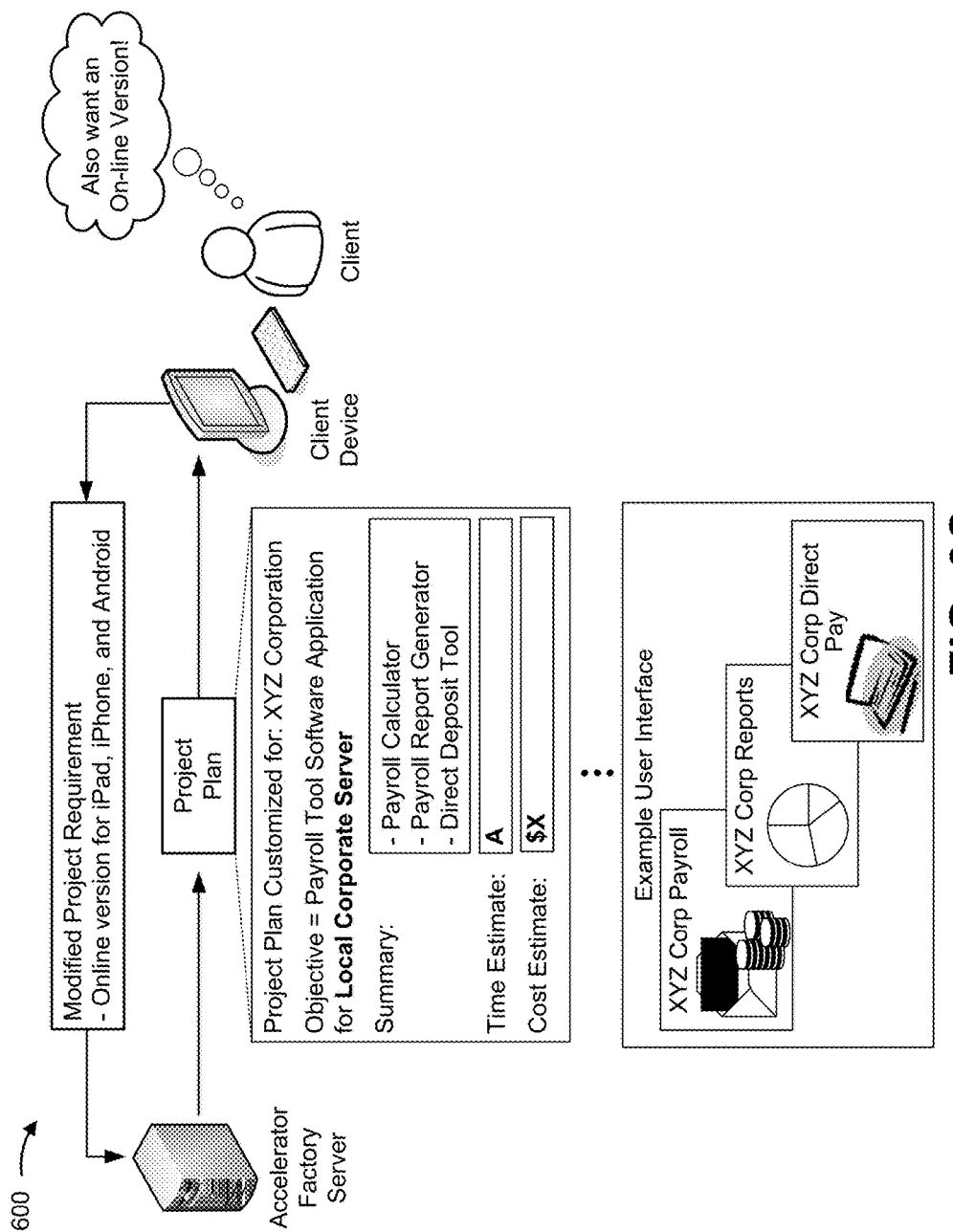

Accelerator factory server 230 creates a project plan and sends the project plan to client XYZ Corporation for validation. The project plan may provide a title for the project (Customized Project Plan for XYZ Corporation) and a scope (Payroll Tool Software Application For XYZ Corporation's Local Corporate Server), as shown in FIG. 6C. The project plan may include a summary of the tools that will be provided in the software application (e.g., payroll calculator, payroll report generator, direct deposit tool, etc.). The project plan may include example user interfaces, showing the tools that may be implemented in the software application. Assume client XYZ Corporation finds that the received project plan aligns with the project requirements provided by XYZ Corporation. Assume, however, after reviewing the project plan, client XYZ Corporation realizes the software application should also include an on-line version (e.g., the payroll tool software application) and provides modified project requirements to accelerator factory server 230, adding an on-line version of the payroll software application for the iPad, iPhone, and Android, as shown in FIG. 6C.

Figure 6D:
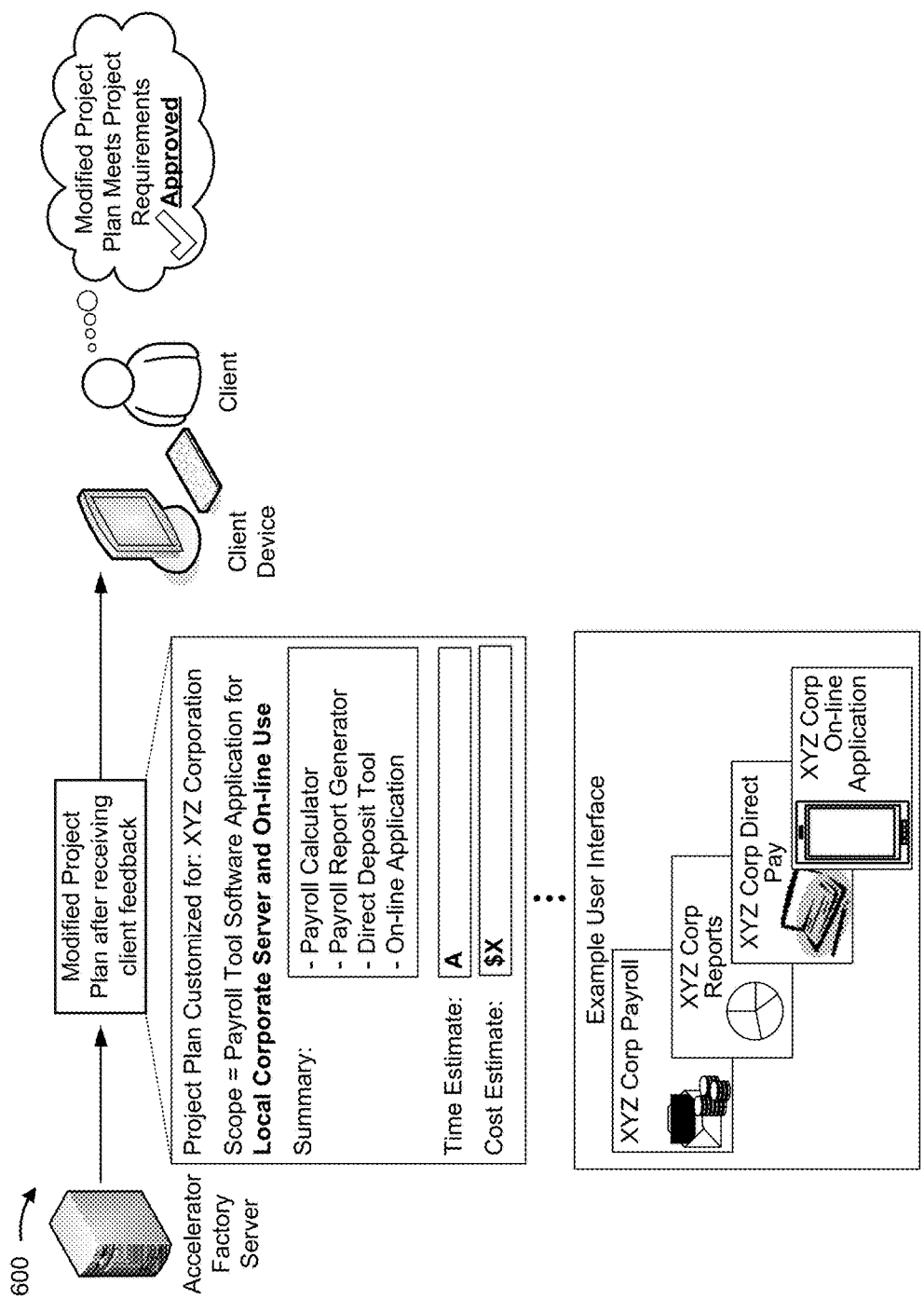

After receiving the modified project requirements, accelerator factory server 230 may submit a modified project plan, including the newly requested project requirement (an on-line version of the payroll tool software application) by XYZ Corporation, as shown in FIG. 6D. The modified project plan may also include an updated example user interface, incorporating the modified project requirements.

Figure 6E:
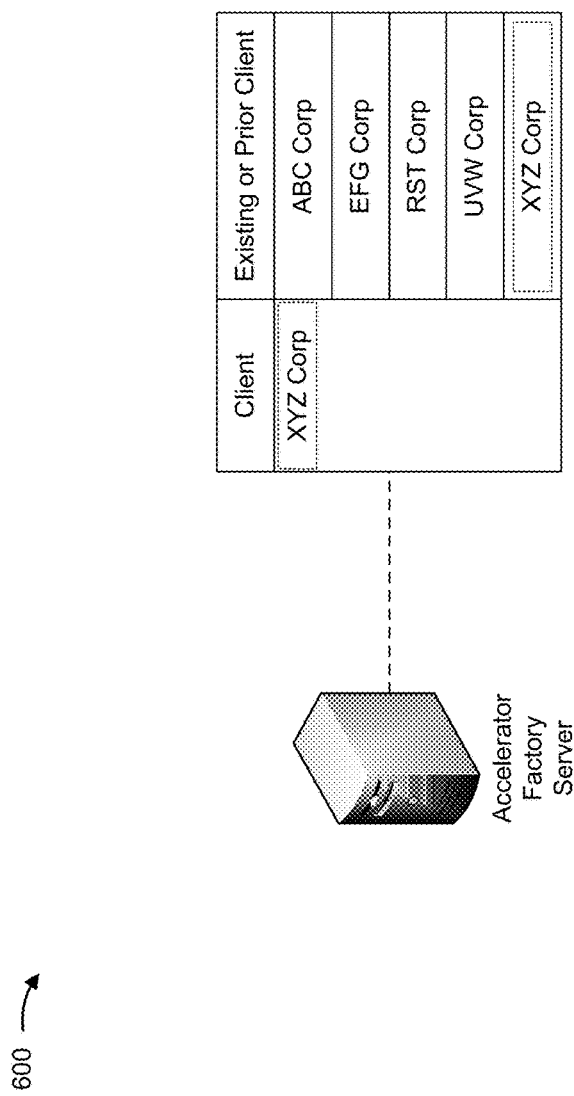

Assume that XYZ was a prior client. Accelerator factory server 230 queries a list of existing and/or prior clients and determines that XYZ Corporation is either an existing client or a prior client, as shown in FIG. 6E.

Figure 6F:
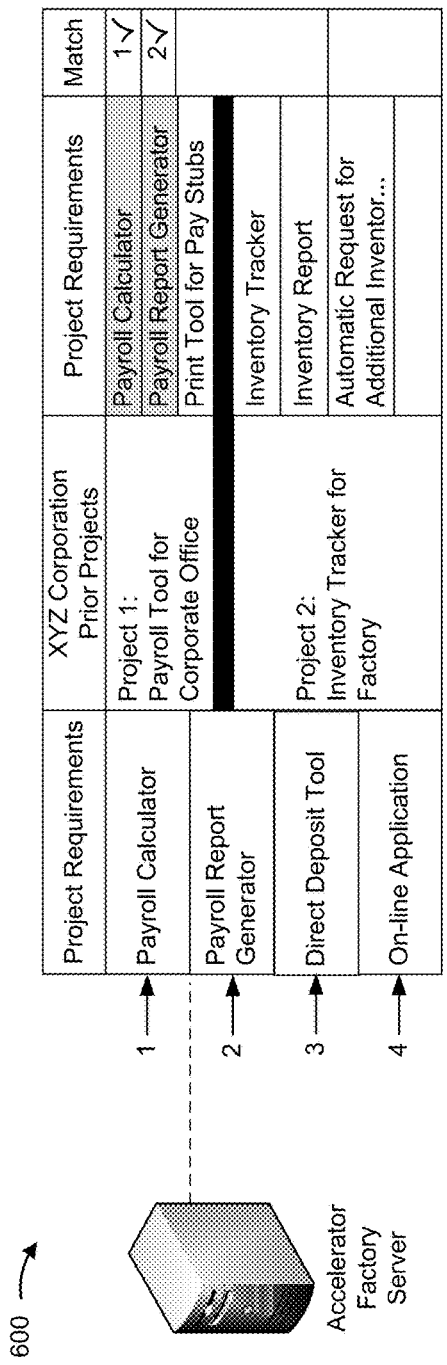

Upon determining that XYZ Corporation is either an existing client or a prior client, accelerator factory server 230 determines whether the project requirements are similar to past project requirements submitted by XYZ Corporation. Assume that XYZ Corporation had submitted project requirements for two projects in the past (Project 1: Payroll Tool for XYZ Corporation's Corporate Office and Project 2:

Inventory Tracker for XYZ Corporation's Factory). As shown in FIG. 6F, accelerator factory server 230 identifies that two of the project requirements, the payroll calculator and the payroll report generator, are similar to two of the past project requirements associated with Project 1. As shown in FIG. 6F, accelerator factory server 230, however, finds XYZ Corporation provided no similar past project requirements to the project requirements directed to the direct deposit tool and the on-line application.

Figure 6G:
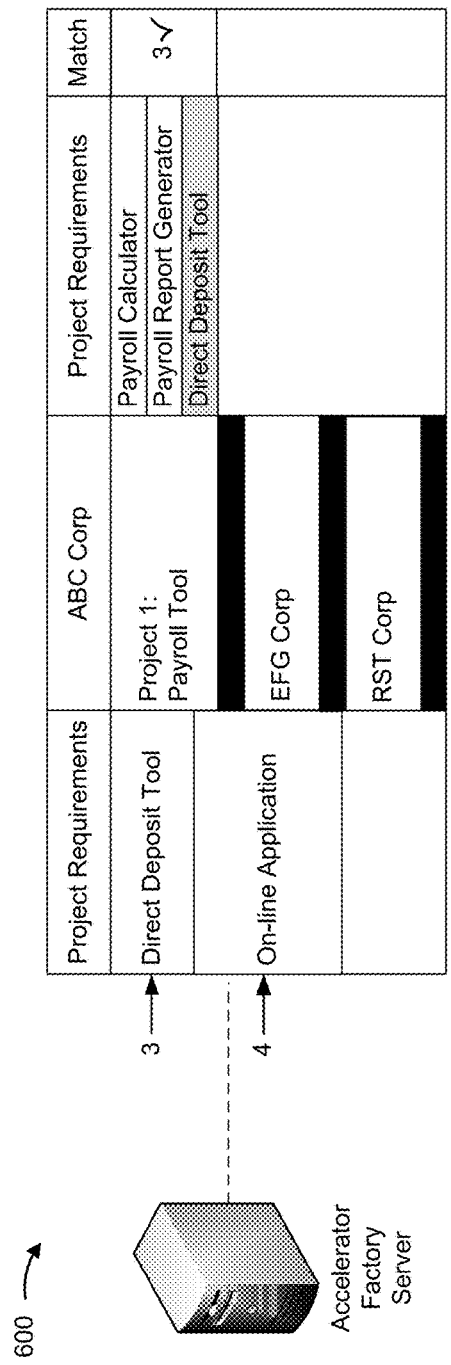

Accelerator factory server 230 determines whether any other existing clients and/or prior clients (e.g., ABC Corporation, EFG Corporation, RST Corporation, etc.) provided similar past project requirements directed to the direct deposit tool and the on-line application. Additionally, or alternatively, accelerator factory server 230 determines whether there are any generic requirements stored in accelerator factory memory 240 and/or another device similar to the project requirements directed to the direct deposit tool and the on-line application. As shown in FIG. 6G, accelerator factory server 230 identifies a similar past project requirement provided by ABC Corporation (e.g., Project 1: Payroll Tool—Direct Deposit tool). Accelerator factory server 230 identifies no similar past project requirement to the project requirement directed to the on-line application.

Figure 6H:
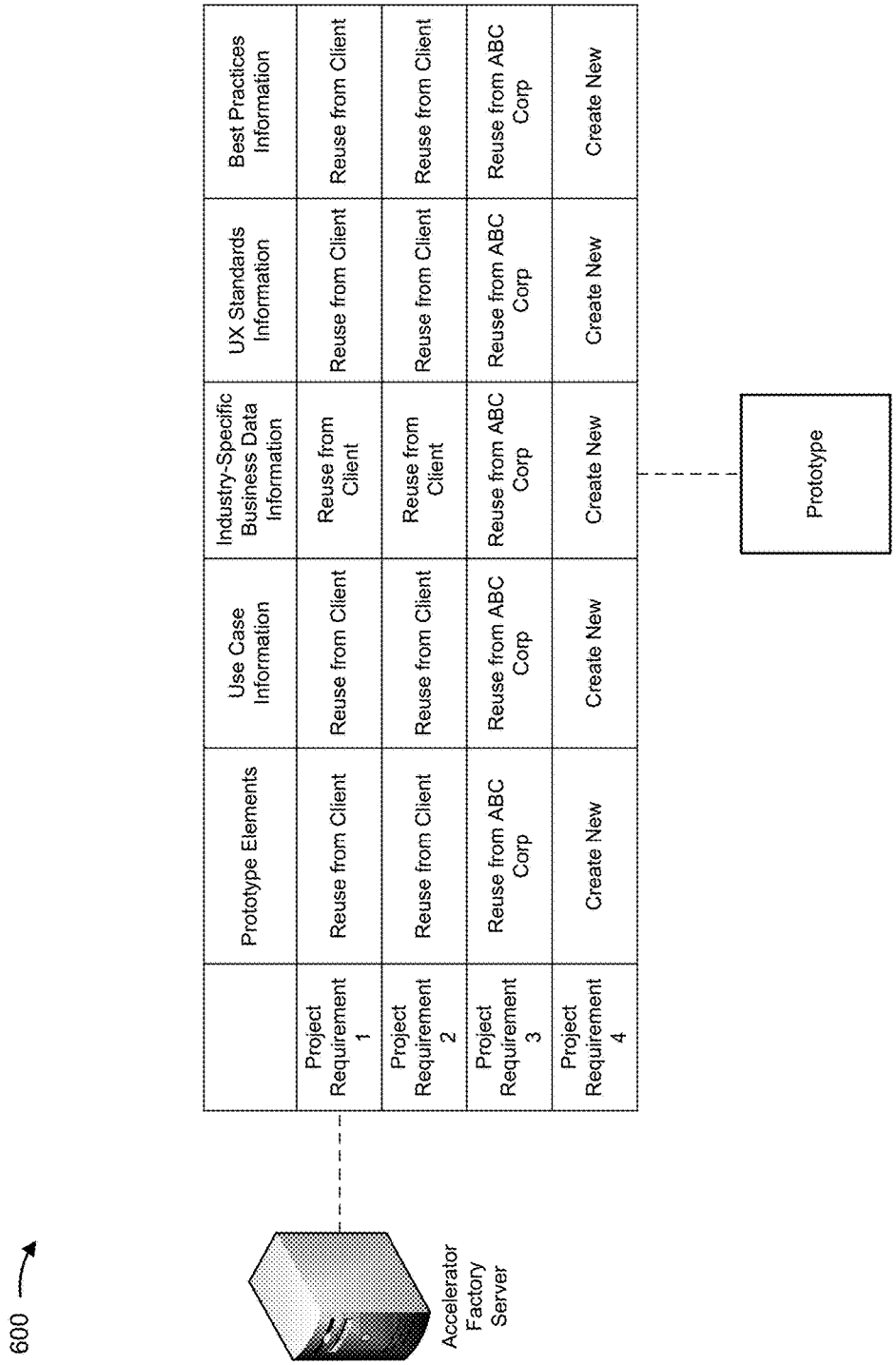

To meet the first and second project requirements (i.e., the payroll calculator and the payroll report generator, respectively), as shown in FIG. 6H, accelerator factory server 230 may reuse the prototypes and/or prototype elements, the use case information, the industry-specific business data information, the UX standards information, and/or the best practices information, developed to satisfy the similar past project requirements provided XYZ Corporation. To meet the third requirement (i.e., the direct deposit tool), accelerator factory server 230 may reuse the prototypes and/or prototype elements, the use case information, the industry-specific business data information, the UX standards information, and/or the best practices information, developed to satisfy the similar past project requirements provided by ABC Corporation.

To meet the fourth requirement (i.e., the on-line application), however, accelerator factory server 230 may create new prototypes and/or prototype elements, new use case information, new industry-specific business data information, new UX standard information, and/or new best practices information. By reusing the prototypes and/or prototype elements, the use case information, the industry-specific business data information, the UX standards information, and/or the best practices information for similar past project requirements and creating new prototypes and/or prototype elements, use case information, industry-specific business data information, UX standards information, and/or best practices information when no similar past project requirements exist, accelerator server 230 builds the functioning prototype of the payroll tool software application, as shown in FIG. 6H.

Accelerator factory server 230 selects members of a development team in order to send the prototype to the development team for review and modification. Accelerator factory server 230 queries a database that contains development team information, including experience information, for a set of development team employees, searching for relevant experience (e.g., prior experience with client XYZ Corporation, prior experience with the prototype element(s) selected for reuse, prior experience with the use case(s) selected for reuse, industry-specific business data experience or in this case, for example, experience with a payroll system, UX standards experience, best practices experience, etc., collectively, referred to as an "experience list"). The experience list may be generated automatically based on the analysis of the project requirements or may be input by a user of accelerator factory server 230.

Accelerator factory server 230 may assign a weight to each relevant experience based on a measure of importance assigned in the project requirements. In some implementations, the weight assigned to each relevant experience may be input by a user of accelerator factory server 230 and/or development team device 250. With reference to FIG. 6I, prior experience with client XYZ Corporation receives a first weight (W1), prior experience with the prototype element(s) selected for reuse receives a second weight (W2), prior experience with the use case(s) selected for reuse receives a third weight (W3), industry-specific business data experience or in this case, for example, experience with a payroll system, receives a fourth weight (W4), UX standards experience receives a fifth weight (W5), and best practices experience receives a sixth weight (W6). Any two or more of these weights may be the same or different.

Accelerator factory server 230 may assign a point value based on a level and/or a quality of the relevant experience for each development team employee. For each relevant experience on the experience list, the point value can be multiplied by the weight assigned to each relevant experience to provide an experience score(s) for each development team employee. For example, as shown in FIG. 6I, development team employees each receives an experience score (e.g., S=point×weight) for each relevant experience on the experience list. A total experience score (T) is determined by summing the experience score(s) of each development team employee. For example, Alice Jones receives an experience score of S1 for prior experience with client XYZ Corporation, an experience score of S2 for prior experience with the prototype element(s) selected for reuse, an experience score of S3 for prior experience with the use case(s) selected for reuse, an experience score of S4 for industry-specific business data experience or in this case, for example, experience with a payroll system, an experience score of S5 for UX standards experience, and an experience score of S6 for best practices experience for a total experience score of T1 (e.g., T1=S1+S2+S3+S4+S5+S6).

Acceleratory factory server 230 selects members for the development team by selecting the fewest number of development team employees (e.g., Alice Jones, Kiran Patel, and David Cobb) achieving the highest experience score for all the relevant experiences on the experience list and with available bandwidth. For example, Kiran Patel and David Cobb receive the highest experience scores of S7 and S19, respectively, for prior experience with client XYZ Corporation. Alice Jones and Kiran Patel receive the highest experience scores of S2 and S8, respectively, for prior experience with the prototype element(s) selected for reuse. David Cobb receives the highest experience score of S21 for prior experience with the use case(s) selected for reuse. Kiran Patel receives the highest experience score of S10 for experience with a payroll system. Alice Jones receives the highest experience score of S5 and S6 for UX standards experience and Best Practices experience, respectively. Alice Jones, Kiran Patel, and David Cobb all have the available bandwidth (e.g., Available Bandwidth='Y') to work as a member of the development team for the payroll tool software application.

Figure 6J:
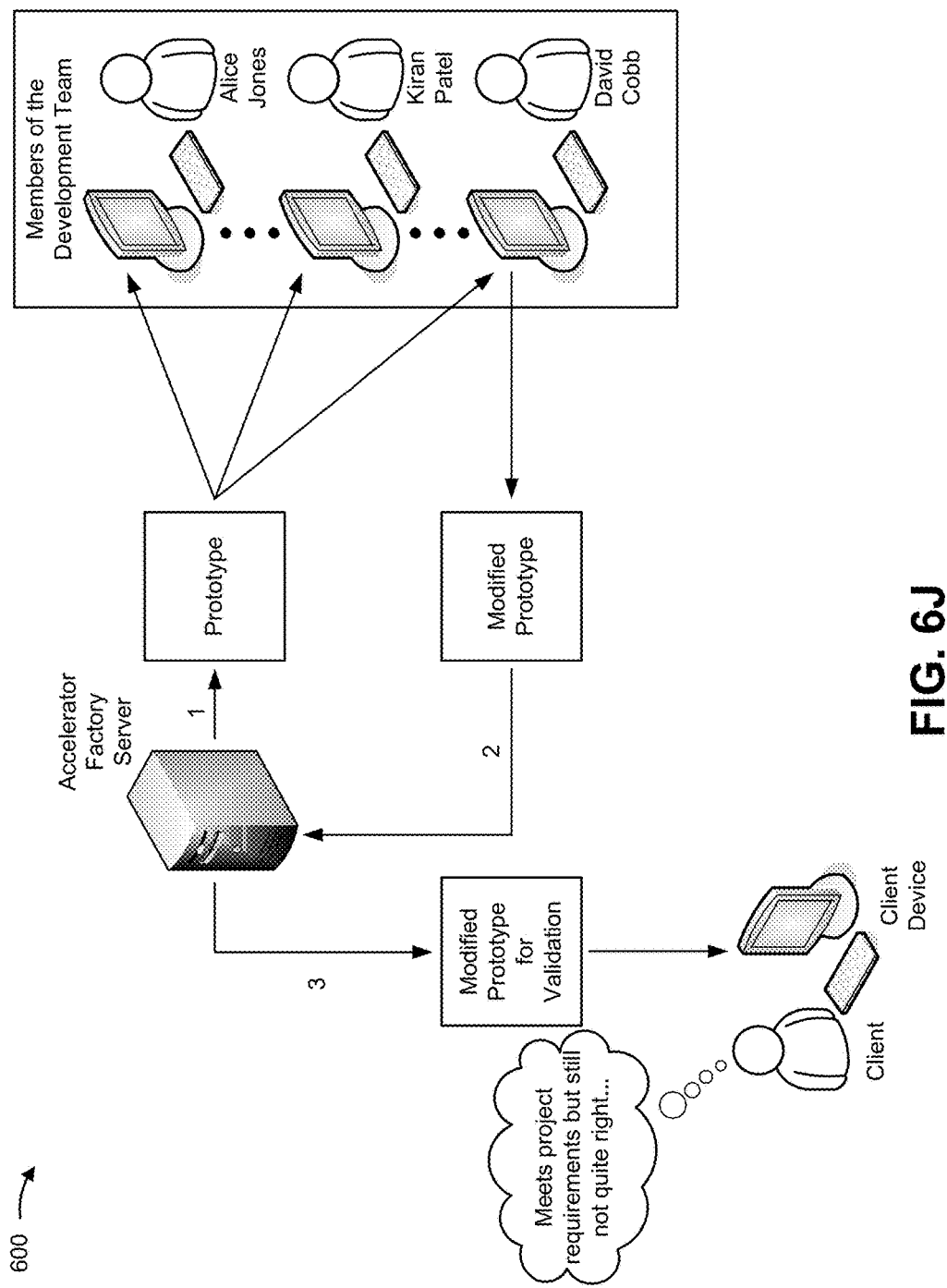

Accelerator factory server 230 sends the prototype to the members of the development team for review and modification. Each member of the development team provides feedback and makes changes, based on their prior relevant experience, as shown in FIG. 6J. Accelerator factory server 230 sends the modified prototype to client XYZ Corporation for review, as shown in FIG. 6J.

Figure 6K:
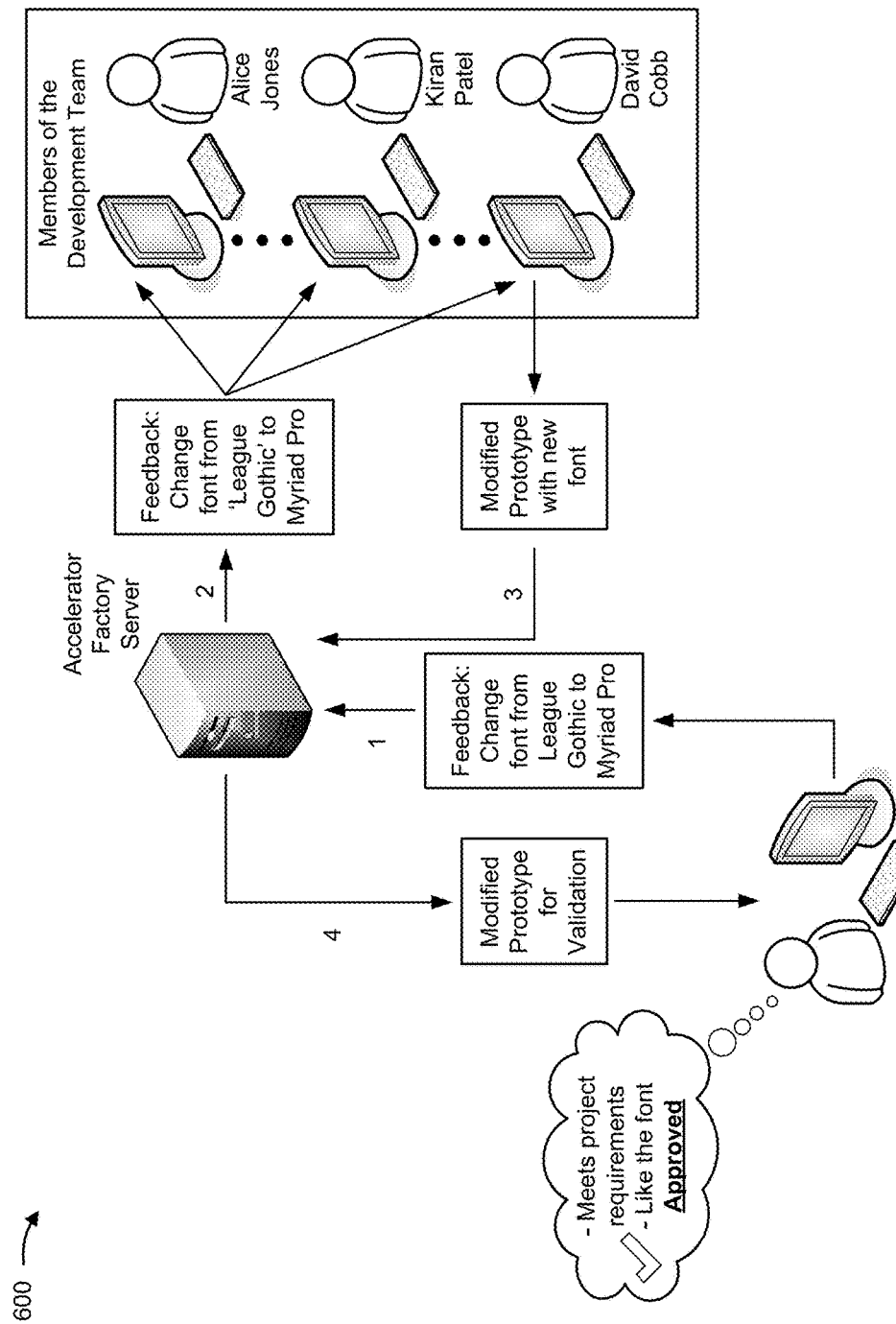

Assume client XYZ Corporation finds that the prototype meets all the project requirements. Assume, however, that client XYZ Corporation is not satisfied with the look and feel of the prototype (e.g., the font used), as shown in FIG. 6J. As shown in FIG. 6K, client XYZ Corporation provides feedback to the development team (e.g., via the accelerator factory server 230), requesting that the font used in the software application is changed from 'League Gothic' to 'Myriad Pro.' The members of the development team modify the prototype to use 'Myriad Pro' font and resend the modified prototype to client XYZ Corporation for validation, as shown in FIG. 6K.

Figure 6L:
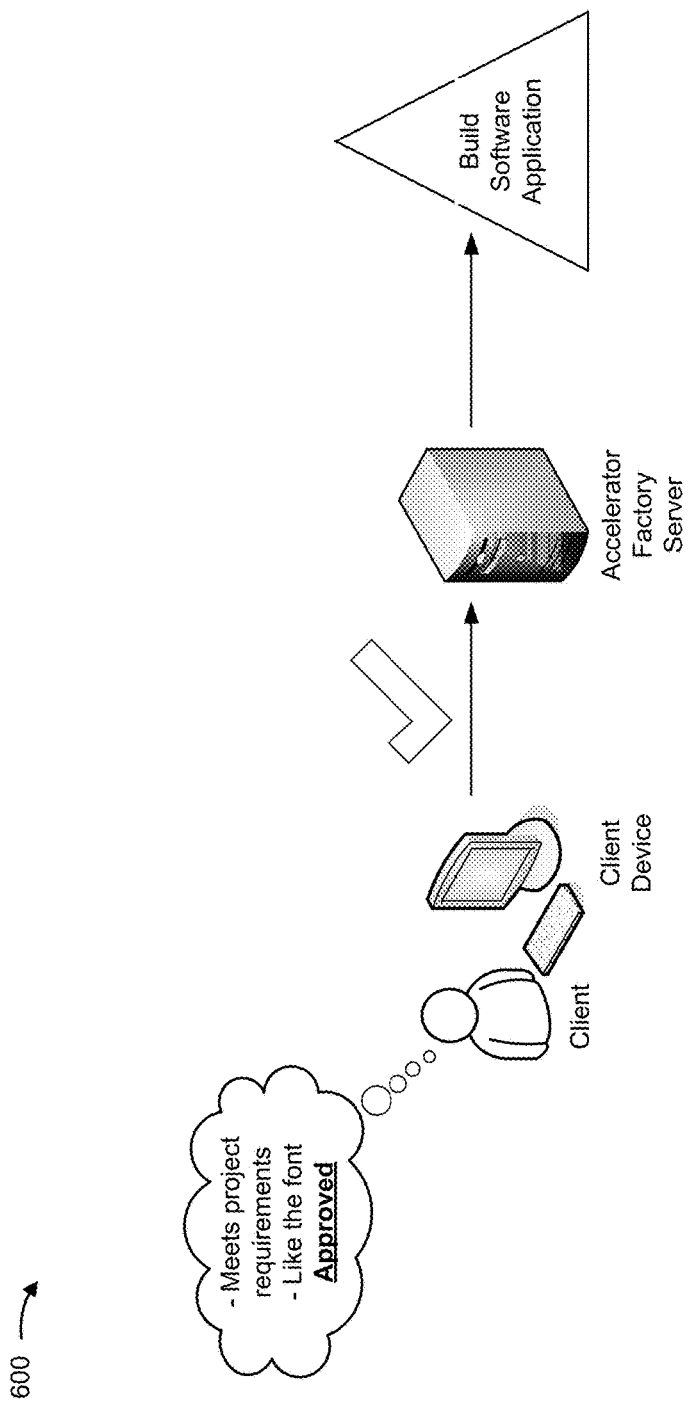

Assume client XYZ Corporation, after seeing the 'Myriad Pro' font applied, is satisfied that the project requirements are met and is happy with the overall look and style of the prototype. As shown in FIG. 6L, client XYZ Corporation validates the prototype and accelerator factory server 230 begins the build-out for the payroll tool software application.

As indicated above, FIGS. 6A-6L are provided merely as an example. Other examples are possible and may differ from what was described with regard to FIGS. 6A-6L.

Implementations described herein provide a prototype accelerator factory that compares project requirements provided by a client with similar past project requirements provided by the client, another client, and/or generic project requirements and uses and/or reuses existing information and/or tools, such as prototype information, use case information, industry-specific business data information, UX standards information, and/or best practices information developed for the similar past project requirement and/or as generic project requirements to rapidly and automatically generate and deliver a final prototype solution to meet the client's expectations.

Additionally, and/or alternatively, implementations described herein provide an automatically generated project plan, based on analyzing the received project requirements, to provide to the client for early feedback. Modifications to the analysis of the project requirements and/or the project plan may be made early in the development process to increase speed of delivery of a final software application and minimize costs.

Additionally, and/or alternatively, implementations described herein provide an automatic selection of members of a development team to identify development team members best suited to deliver a final prototype solution to meet the client's expectations.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory storing instructions; and
   one or more processors to execute the instructions to:
   receive a plurality of project requirements from a client for development of a software application,
   the plurality of project requirements being received via a web-based form;
   identify the client that submitted the plurality of project requirements;
   query, based on identifying the client that submitted the plurality of project requirements, the memory for a past project requirement submitted by the client;
   determine information created or used for the past project requirement, the information created or used for the past project requirement including one or more previously generated prototype elements and at least one of:
   industry-specific business data information used to generate the one or more previously generated prototype elements, or
   user experience standards information implemented for the one or more previously generated prototype elements;
create information for a particular project requirement of the plurality of project requirements;
generate a prototype of the software application based on the information created or used for the past project requirement and the information created for the particular project requirement;
determine an available bandwidth to work as a member of a development team for each development team employee of a plurality of development team employees;
assign a respective experience score to each relevant experience, of a plurality of relevant experiences, for each development team employee that is associated with the available bandwidth to work as the member of the development team;
select a development team employee, from the plurality of development team employees, as the member of the development team based on an experience score, of the respective experience score for each development team employee that is associated with the available bandwidth to work as the member of the development team, associated with the development team employee;
output the prototype to the development team employee;
receive a validation of the prototype;
generate, based on receiving the validation and by utilizing an integrated set of software coding tools that use the prototype as a template, a source code program for a build-out of the software application;
create one or more databases using the integrated set of software coding tools; and
populate the one or more databases with data for testing and validation.

2. The device of claim 1, where the one or more processors are further to:
   create a project plan based on the plurality of project requirements;
   receive feedback regarding the project plan; and
   create a new project plan or modify the project plan based on the feedback.

3. The device of claim 1, where the one or more processors are further to:
   select members of the development team to modify the prototype to meet the plurality of project requirements; and
   send the prototype, as modified by the members of the development team, to the client.

4. The device of claim 1, where the information created or used for the past project requirement further includes at least one of:
   one or more prototypes,
   use case information,
   best practices information associated with the past project requirement.

5. The device of claim 1, where the one or more processors are further to:
   assign a respective similarity score to each past project requirement of the plurality of past project requirement based on a comparison of the past project requirement and each of the plurality of past project requirements; and
   select the past project requirement based on a similarity score of the past project requirement.

6. The device of claim 5, where the one or more processors, when selecting the past project requirement, are to:
   select the past project requirement based on the similarity score of the past project requirement being greater than respective similarity scores of other ones of the plurality of past project requirements.

7. The device of claim 5, where the one or more processors, when selecting the past project requirement, are to:
   select the past project requirement based on the similarity score of the past project requirement satisfying a threshold.

8. A computer-readable medium storing instructions, the instructions comprising:
   one or more instructions that, when executed by one or more processors, cause the one or more processors to:
   receive a plurality of project requirements for development of a software application,
      the plurality of project requirements being received via a web-based form;
   query a memory for a past project requirement;
   determine information created or used for the past project requirement,
      the information created or used for the past project requirement including one or more previously generated prototype elements and at least one of:
         industry-specific business data information used to generate the one or more previously generated prototype elements, or
         user experience standards information implemented for the one or more previously generated prototype elements;
   create information for a particular project requirement of the plurality of project requirements;
   generate a prototype of the software application based on the information created or used for the past project requirement and the information created for the particular project requirement;
   determine an available bandwidth to work as a member of a development team for each development team employee of a plurality of development team employees;
   assign a respective experience score to each relevant experience, of a plurality of relevant experiences, for each development team employee that is associated with the available bandwidth to work as the member of the development team;
   select a development team employee, from the plurality of development team employees, as the member of the development team based on an experience score, of the respective experience score for each development team employee that is associated with the available bandwidth to work as the member of the development team, associated with the development team employee;
   output the prototype to the development team employee;
   receive a validation of the prototype;
   generate, based on receiving the validation and by utilizing an integrated set of software coding tools that use the prototype as a template, a source code program for a build-out of the software application;
create one or more databases using the integrated set of software coding tools; and
populate the one or more databases with data for testing and validation.

9. The computer-readable medium of claim 8, where the one or more instructions, that cause the one or more processors to select the development team employee from the plurality of development team employees, as the member of the development team based on the experience score of the development team employee, cause the one or more processors to:
select the development team employee, from the plurality of development team employees, as the member of the development team based on the experience score of the development team employee being greater than respective experience scores of other ones of the plurality of development team employees.

10. The computer-readable medium of claim 8, where the one or more instructions, that cause the one or more processors to select the development team employee from the plurality of development team employees, as the member of the development team based on the experience score of the development team employee, cause the one or more processors to:
select the development team employee, from the plurality of development team employees, as the member of the development team based on the experience score of the development team employee satisfying a threshold.

11. The computer-readable medium of claim 8, where the plurality of relevant experiences include one or more of prior experience with a client sending the plurality of project requirements, or prior experience with the information created or used for the past project requirement.

12. The computer-readable medium of claim 8, when the one or more instructions, where executed by the one or more processors, further cause the one or more processors to:
receive a modification to the prototype made by the development team employee; and
send the prototype, with the modification, to a client for validation.

13. The computer-readable medium of claim 8, when the one or more instructions, where executed by the one or more processors, further cause the one or more processors to:
receive feedback, from a client, regarding the prototype;
modify the prototype based on the feedback; and
send the modified prototype to a client for validation.

14. A method, comprising:
receiving, by one or more processors, a plurality of project requirements from a client for development of a software application,
the plurality of project requirements being received via a web-based form;
querying, by one or more processors, a memory for a past project requirement;
determining, by the one or more processors, information created or used for the past project requirement,
the information created or used for the past project requirement including one or more previously generated prototype elements and at least one of:
industry-specific business data information used to generate the one or more previously generated prototype elements, or
user experience standards information implemented for the one or more previously generated prototype elements;
creating or receiving, by the one or more processors, information for a particular project requirement of the plurality of project requirements;
generating, by the one or more processors, a prototype of the software application based on the information created or used for the past project requirement and the information created or received for the particular project requirement;
determining, by the one or more processors, an available bandwidth to work as a member of a development team for each development team employee of a plurality of development team employees;
assigning, by the one or more processors, a respective experience score to each relevant experience, of a plurality of relevant experiences, for each development team employee that is associated with the available bandwidth to work as the member of the development team;
selecting, by the one or more processors, a development team employee, from the plurality of development team employees, as the member of the development team based on an experience score, of the respective experience score for each development team employee that is associated with the available bandwidth to work as the member of the development team, associated with the development team employee;
outputting, by the one or more processors, the prototype to the development team employee;
receiving, by the one or more processors, a validation of the prototype;
generating, by the one or more processors and based on receiving the validation and by utilizing an integrated set of software coding tools that use the prototype as a template, a source code program for a build-out of the software application;
creating, by the one or more processors, one or more databases using the integrated set of software coding tools; and
populating, by the one or more processors, the one or more databases with data for testing and validation.

15. The method of claim 14, further comprising:
determining each relevant experience of the plurality of relevant experiences without user input specifying the relevant experience.

16. The method of claim 14, further comprising:
selecting a first member of the development team, from the plurality of development team employees, for each of the plurality of relevant experiences based on an experience score of the first member; and
selecting a second member of the development team, from the plurality of development team employees, for each of the plurality of relevant experiences based on the experience score of the second member if the first member does not have the available bandwidth to work as a member of the development team.

17. The method of claim 14,
where the respective experience score is assigned a weight based on a level of importance assigned to each relevant experience.

18. The method of claim 17, where the weight is determined without user input specifying the level of importance assigned to each relevant experience.

19. The method of claim 14, further comprising:
calculating a respective total experience score based on the respective experience score for each relevant experience of the plurality of relevant experiences for each development team employee of the plurality of development team employees; and where selecting the development team employee comprises:

selecting the development team employee based on a total experience score of the development team employee.

20. The method of claim 19, where selecting the development team employee further comprises:

selecting the development team employee based on the total experience score of the development team employee satisfying a threshold.

* * * * *